(12) United States Patent
Manohar et al.

(10) Patent No.: US 9,794,341 B2
(45) Date of Patent: Oct. 17, 2017

(54) DATA STORAGE VERIFICATION IN DISTRIBUTED STORAGE SYSTEM

(71) Applicant: SanDisk Enterprise IP LLC, Milpitas, CA (US)

(72) Inventors: Abhijeet Manohar, Bangalore (IN); Daniel Tuers, Kapaa, HI (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 369 days.

(21) Appl. No.: 14/494,807

(22) Filed: Sep. 24, 2014

(65) Prior Publication Data

US 2015/0381729 A1 Dec. 31, 2015

Related U.S. Application Data

(60) Provisional application No. 62/019,361, filed on Jun. 30, 2014.

(51) Int. Cl.
*H04L 29/08* (2006.01)
*H04L 29/06* (2006.01)
*H04W 12/02* (2009.01)

(52) U.S. Cl.
CPC ........ *H04L 67/1097* (2013.01); *H04L 63/065* (2013.01); *H04W 12/02* (2013.01)

(58) Field of Classification Search
USPC ........................................................ 713/189
See application file for complete search history.

(56) References Cited

U.S. PATENT DOCUMENTS

| 8,505,102 B1* | 8/2013 | Cannings | H04L 63/145 713/187 |
| 2005/0265555 A1* | 12/2005 | Pippuri | G06F 21/10 380/284 |
| 2008/0168332 A1* | 7/2008 | Palanki | H04L 1/0007 714/776 |
| 2010/0275026 A1* | 10/2010 | McLean | G06F 21/12 713/176 |
| 2011/0040825 A1* | 2/2011 | Ramzan | G06F 21/55 709/203 |

* cited by examiner

*Primary Examiner* — William Goodchild
(74) *Attorney, Agent, or Firm* — Morgan, Lewis & Bockius LLP

(57) ABSTRACT

A server system with one or more processors and memory sends a verification request, to a client device, to verify that the client device is storing a data block, where the verification request includes verification parameters. In response, the server system obtains from the client device a first verification value for the data block. The server system compares the first verification value with a second verification value for the data block, where the second verification value was previously computed, in accordance with the data block and the verification parameters, and stored by the server system. In accordance with a determination that the first verification value matches the second verification value, the server system confirms that the client device is storing the data block.

19 Claims, 16 Drawing Sheets

Lessee Profile 500

| User ID 502 |
| --- |
| Base Location 504 |
| Temporary Location(s) 506 |
| Storage Criteria 508 |

Figure 5A

Lessor Profile 550

| User ID 552 |
| --- |
| Base Location 554 |
| Temporary Location(s) 556 |
| Leased Space 558 |
| Storage Rating 560 |

Figure 5B

Verification
Table 252

| Data Block ID 802-A | Location(s) 804-A | Verification Data 806-A |
|---|---|---|
| Data Block ID 802-B | Location(s) 804-B | Verification Data 806-B |
| ⋮ | | |
| Data Block ID 802-N | Location(s) 804-N | Verification Data 806-N |

| Verification Parameters 812-A | Verification Value 814-A |
|---|---|
| Verification Parameters 812-B | Verification Value 814-B |
| ⋮ | ⋮ |
| Verification Parameters 812-N | Verification Value 814-N |

| TAP Seed 822 |
|---|
| Starting Seed 824 |
| # of Rotations 826 |
| ⋮ |

Figure 8

DATA STORAGE VERIFICATION IN DISTRIBUTED STORAGE SYSTEM

RELATED APPLICATIONS

This application claims priority to U.S. Provisional Patent Application 62/019,361, entitled "Data Storage Verification in Distributed Storage System," filed Jun. 30, 2014, which is hereby incorporated by reference in its entirety.

TECHNICAL FIELD

The disclosed embodiments relate generally to memory systems, and in particular, to distributed storage systems.

BACKGROUND

Cloud storage systems are able to store a large amount of data at relatively low costs. However, an end user may experience significant latency when fetching data from said cloud storage systems based on geographic distance from the location where the end user's data is stored.

SUMMARY

Some embodiments include systems, methods, and devices for operating and managing a distributed storage system. The distributed storage system includes a server system and a plurality of client devices. In some embodiments, users (i.e., lessees) of distributed storage system lease memory space from other users (i.e., lessors) of the distributed storage system. For example, a lessee leases memory from lessors to store a portion of his/her data (e.g., important files) in distributed storage system so as to act as a backup the data in case his/her device dies or to act as a replica copy of the data for access on alternate devices. Furthermore, lessors lease out a portion of the memory of their respective client devices so as to collect payment for unused memory space.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

FIG. 5A is a block diagram of an implementation of a user profile for a lessee in the distributed storage system in accordance with some embodiments.

FIG. 5B is a block diagram of an implementation of a user profile for a lessor in the distributed storage system in accordance with some embodiments.

FIG. 8 is a block diagram of an implementation of a verification table in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 1:
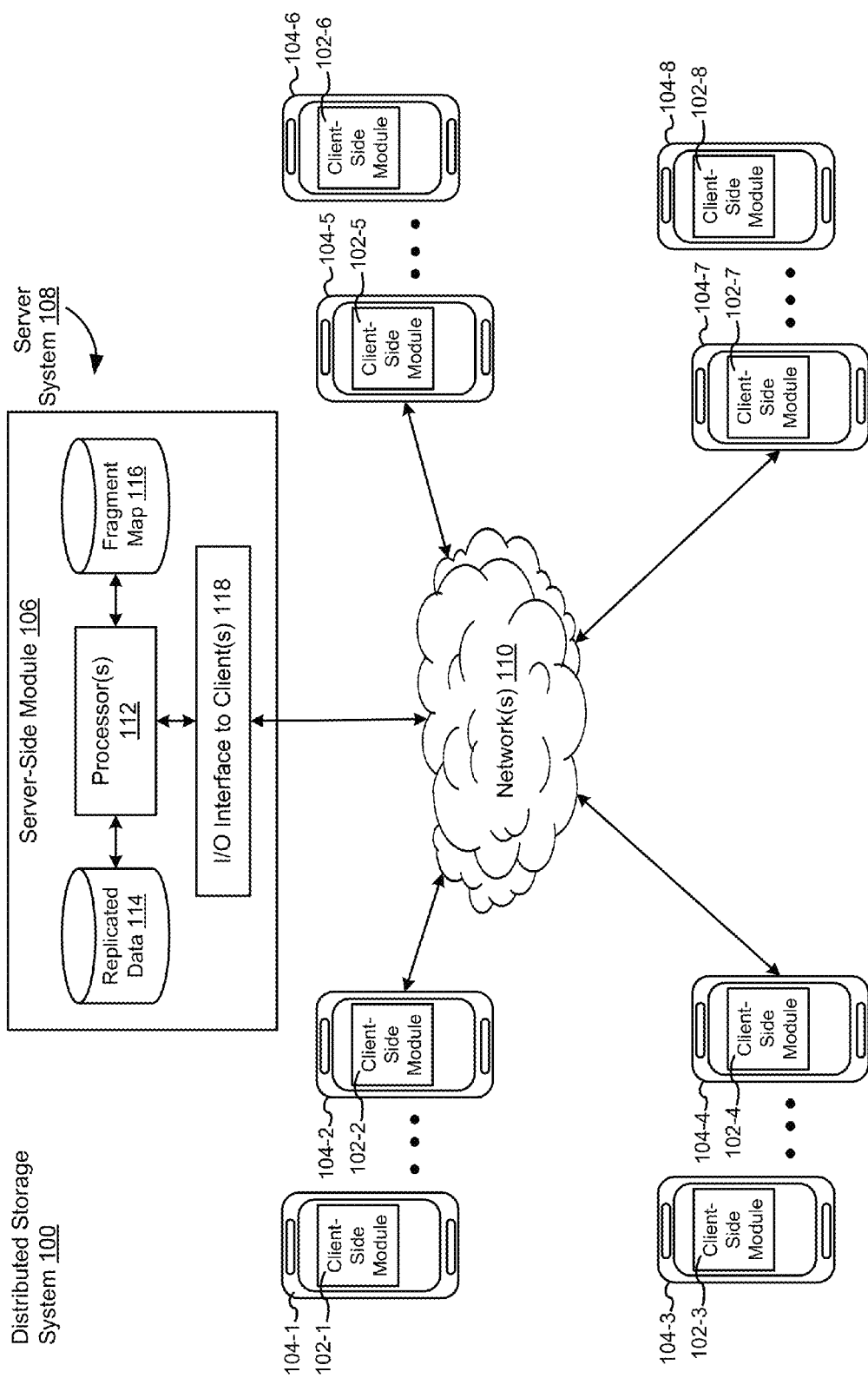
FIG. 1 is a block diagram illustrating an implementation of a distributed storage system in accordance with some embodiments.

The various implementations described herein include systems, methods, and/or devices for operating and managing a distributed storage system (e.g., distributed storage system 100, FIG. 1).

Figure 2:
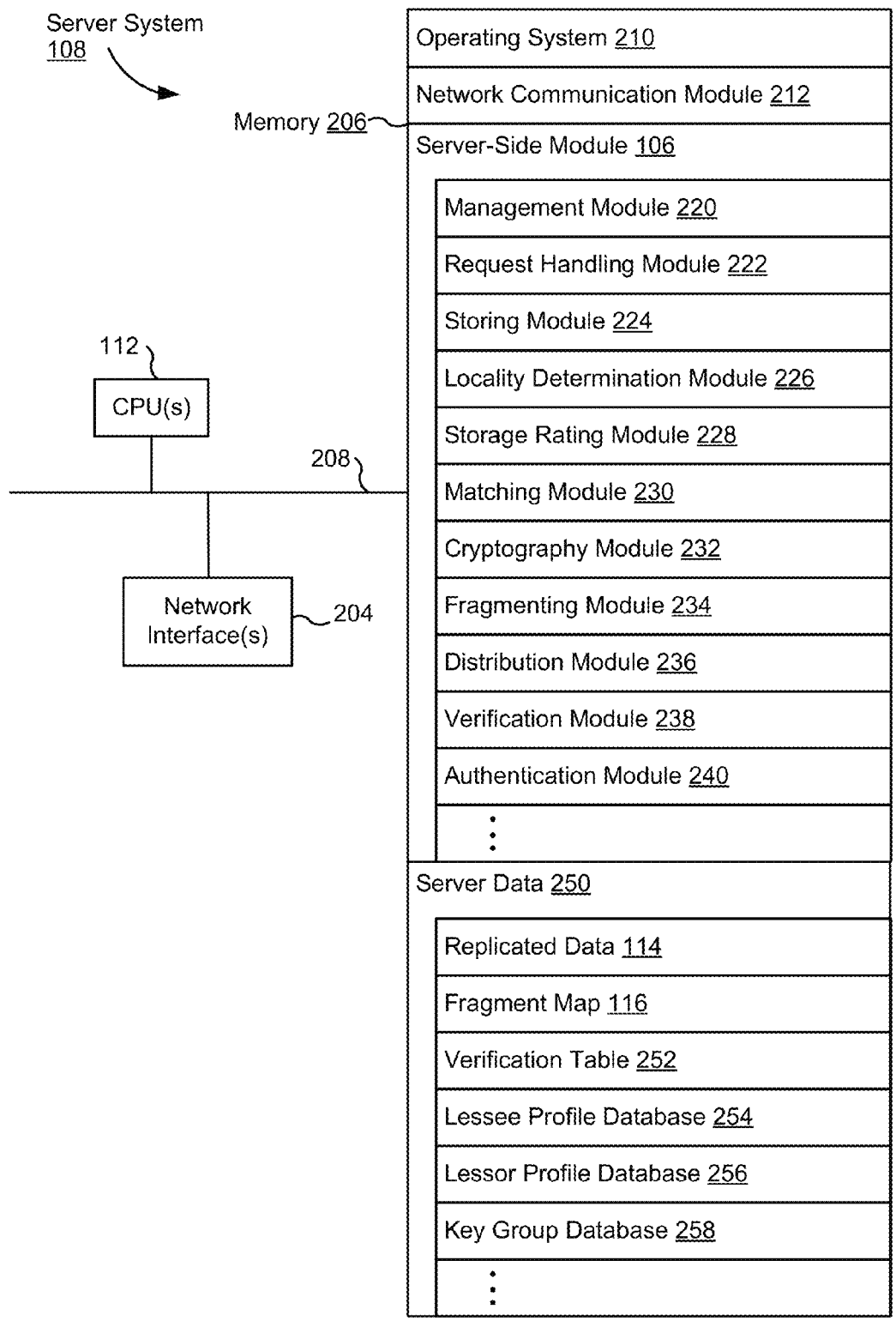
FIG. 2 is a block diagram of a server system in accordance with some embodiments.

Some embodiments include a method of verifying storage of data blocks in a distributed storage system (e.g., distributed storage system 100, FIG. 1) that includes a plurality of client devices (e.g., client devices 104, FIGS. 1 and 3) and a server system (e.g., server system 108, FIGS. 1-2). In some embodiments, the method is performed by the server system (e.g., server system 108, FIGS. 1-2), which includes one or more processors and memory. The method includes sending a verification request, to a client device (e.g., client device 104, FIGS. 1 and 3), to verify that the client device is storing a data block, the verification request includes one or more verification parameters to be used by the client device in computing a first verification value for the data block. In response to the verification request, the method includes obtaining, from the client device, the first verification value for the data block, where the first verification value is computed by the client device based on the data block and the one or more verification parameters. The method includes comparing the first verification value with a second verification value for the data block, where the second verification value was previously computed, in accordance with the data block and the one or more verification parameters, and stored by the server system. In accordance with a determination that the first verification value matches the second verification value, the method includes confirming that the client device is storing the data block.

Some embodiments include a method of storing data in a distributed storage system (e.g., distributed storage system 100, FIG. 1) that includes a plurality of client devices (e.g., client devices 104, FIGS. 1 and 3) and a server system (e.g., server system 108, FIGS. 1-2). In some embodiments, the method is performed by the server system (e.g., server system 108, FIGS. 1-2), which includes one or more processors and memory. The method includes receiving, from a first client device of the plurality of client devices, a storage request to store data in the distributed storage system. In response to receiving the storage request, the method includes: identifying a group of one or more other client devices from among the plurality of client devices that satisfy one or more predefined storage criteria; and storing a data fragment of the data on each of the identified group of one or more other client devices. In some embodiments, the plurality of client devices are communicatively coupled with the server system, at least in part, by a wireless communication network that is configured for both telephonic communications and data communications.

Some embodiments include a method of recovering data stored in a distributed storage system (e.g., distributed storage system 100, FIG. 1) that includes a plurality of client devices (e.g., client devices 104, FIGS. 1 and 3) and a server system (e.g., server system 108, FIGS. 1-2). In some embodiments, the method is performed by a respective client device (e.g., client device 104, FIGS. 1 and 3), which includes one or more processors and memory. The method includes sending a request, to the server system, for a key group associated with data stored in the distributed storage system. In response to the request, the method includes receiving, from the server system, the key group. The method includes decrypting the key group so as to obtain a plurality of keys for a plurality of data fragments stored in the distributed storage system at a set of client devices other than the first client device, where for each data fragment of the plurality of data fragments there is a corresponding key in the plurality of keys. The method includes: for at least two respective data fragments of the plurality of data fragments: receiving the respective data fragment from one of the set of other client devices of the distributed storage system; and decrypting the respective data fragment with the corresponding key.

Some embodiments include an electronic device or system (e.g., client device 104, FIGS. 1 and 3 or server system 108, FIGS. 1-2), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of an electronic device or system (e.g., client device 104, FIGS. 1 and 3 or server system 108, FIGS. 1-2), the one or more programs including instructions for performing or controlling performance of any of the methods described herein. Some embodiments include an electronic device or system (e.g., client device 104, FIGS. 1 and 3 or server system 108, FIGS. 1-2) comprising means for performing or controlling performance of the operations of any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a distributed storage system 100 in accordance with some embodiments. In some embodiments, users (i.e., lessees) of distributed storage system 100 lease memory space from other users (i.e., lessors) of distributed storage system 100. While some example features are illustrated, various other features have not been illustrated for the sake of brevity and so as not to obscure more pertinent aspects of the example embodiments disclosed herein. To that end, as a non-limiting example, distributed storage system 100 is implemented in a server-client environment in accordance with some embodiments. In accordance with some embodiments, the server-client environment includes client-side processing 102 (hereinafter "client-side module 102") (e.g., client-side modules 102-1, 102-2, 102-3, 102-4, 102-5, 102-6, 102-7, and 102-8) executed on client devices 104 (e.g., client devices 104-1, 104-2, 104-3, 104-4, 104-5, 104-6, 104-7, and 104-8), and server-side processing 106 (hereinafter "server-side module 106") executed on a server system 108.

A respective client-side module 102 communicates with server-side module 106 through one or more networks 110. Client-side module 102 provides client-side functionalities for distributed storage system 100 (e.g., issuing and/or servicing requests, etc.) and communications with server-side module 106. Server-side module 106 provides server-side functionalities for distributed storage system 100 (e.g., operating and managing distributed storage system 100, matching lessors with lessees, issuing requests to lessors, servicing requests from lessees, etc.) for any number of client modules 102 each residing on a respective client device 104.

In some embodiments, server-side module 106 includes one or more processors 112, (optionally) replicated data 114, fragment map 116, and an I/O interface to one or more clients 118. I/O interface to one or more clients 118 facilitates the client-facing input and output processing for server-side module 106. One or more processors 112 receive storage requests from lessees, match lessors with lessees, and issue verification requests to lessors. In some embodiments, replicated data 114, optionally, stores one or more copies of data associated with a storage request from a lessee that is also stored by one or more lessors. In some embodiments, fragment map 116 associates fragments of data stored by lessors with lessor identifiers so as to track data stored in distributed storage system 100.

In some embodiments, a respective user of distributed storage system 100 is either a lessee or a lessor, whereby the respective user either leases memory space from lessors or leases out memory space to lessees. In some embodiments, a respective user of distributed storage system 100 is both a lessee and a lessor, whereby the respective user leases memory space from lessors and leases out memory space to lessees. For example, the respective user wishes to lease memory from lessors to store a portion of his/her data (e.g., important files) in distributed storage system 100 so as to act as a backup the data in case his/her device dies or to act as a replica copy of the data for access on alternate devices. Continuing with this example, the respective user also wishes to lease out to other lessees a portion of his/her client device 104 that is unused so as to pay for the leased space and to make extra money.

In some embodiments, when a user (i.e., a lessee) of distributed storage system 100, associated with a respective client device 104, wishes to store data in distributed storage system 100, server-side module 106 matches one or more lessors with the lessee. For example, server-side module 106 matches the lessee with the one or more lessors so that requests issued by the lessee (e.g., storage, fetch, and erase requests) are serviced faster by the one or more matched lessors than a centralized server (e.g., server system 108). As such, lessees are able to faster access their data and lessors are able to lease a portion of the memory of their client devices 104 (e.g., unused space) in exchange for compensation.

In some embodiments, the memory leased by the one or more lessors is volatile memory or a non-volatile memory (NVM) device such as magnetic disk storage, optical disk storage, flash memory, three-dimensional (3D) memory (as further described herein), or other NVM memory. In some embodiments, the memory leased by the one or more lessors is NAND-type flash memory or NOR-type flash memory. However, one or more other types of storage media may be included in accordance with aspects of a wide variety of embodiments.

In some embodiments, server-side module 106 manages storage of data in distributed storage system 100. For example, server system 108 maintains and stores fragment map 116 which maps fragments of data stored in distributed storage system 100 to lessor(s) for the data fragments so as to track data stored in distributed storage system 100 (See FIG. 4 and accompanying text for further discussion). In some embodiments, server system 108 also stores a copy of the data in replicated data 114. In some embodiments, server-side module 106 matches a lessee with one or more lessors (e.g., based on storage criteria specified by the lessee and storage ratings for the lessors). In some embodiments, server-side module 106 authenticates users of distributed storage system 100 to maintain the security and integrity of distributed storage system 100. In some embodiments, server-side module 106 verifies the storage of data in distributed storage system 100. For example, server system 108 periodically issues storage challenges or verification requests to lessors in order to determine whether the lessors still store the data they promised to store.

Figure 3:
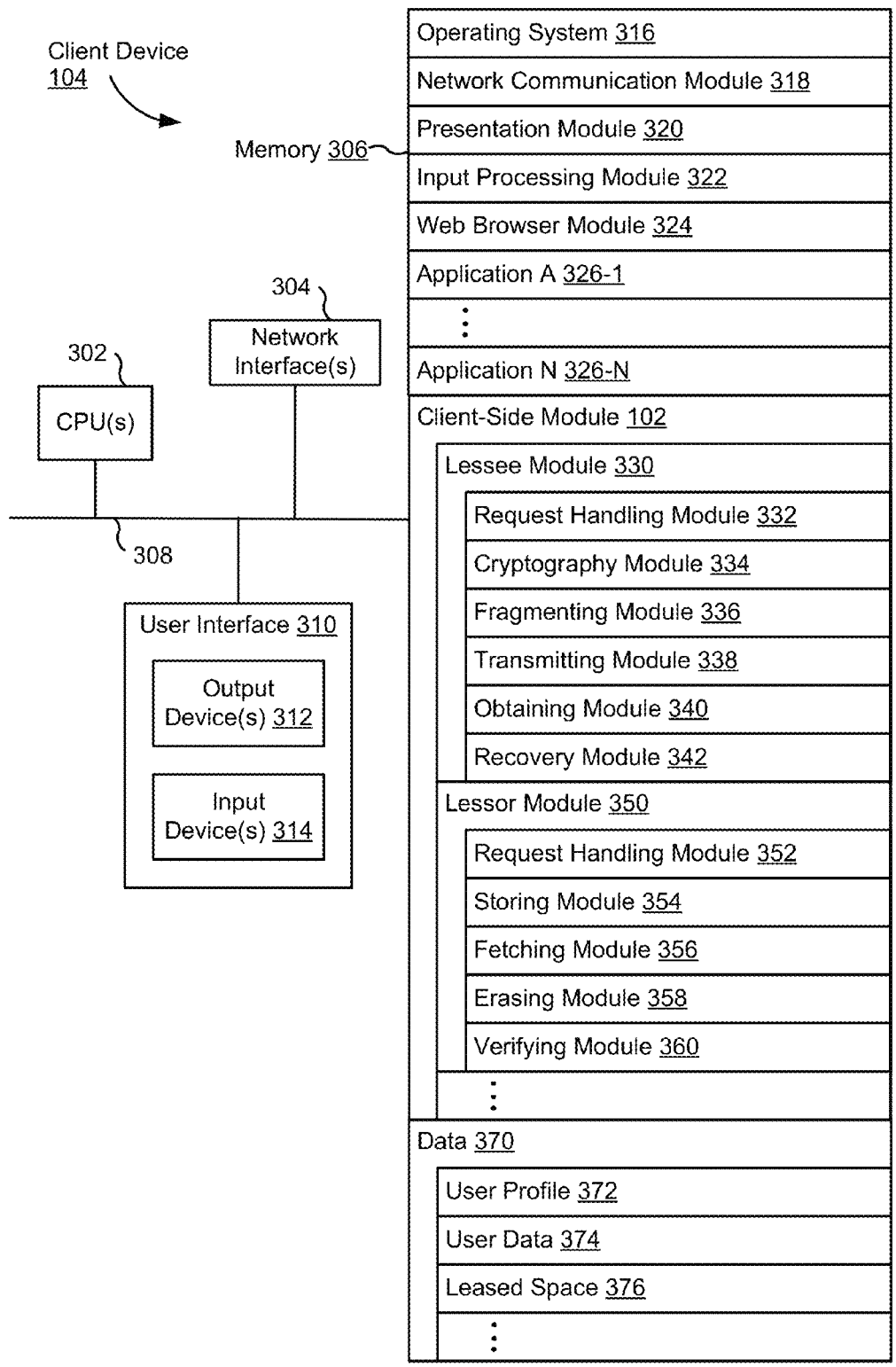
FIG. 3 is a block diagram of a client device in accordance with some embodiments.

A respective lessee is able to issue a plurality of request types associated with distributed storage system 100 (e.g., requests to store data, fetch data, or erase data) via client-side module 102 or a component thereof (e.g., request handling module 332, FIG. 3). In some embodiments, the respective lessee sends a storage request to server system 108 to store data (e.g., one or more files) in distributed storage system 100. In some embodiments, the respective lessee sends a fetch request to server system 108 to fetch data stored in distributed storage system 100. In some embodiments, the respective lessee sends an erase request to server system 108 to erase data stored in distributed storage system 100.

A respective lessor is able to service a plurality of request types associated with distributed storage system 100 (e.g., requests to confirm free space, store data, fetch data, erase data, or verify storage of data) via client-side module 102 or a component thereof (e.g., request handling module 352, FIG. 3). In some embodiments, a respective lessor receives a request from server system 108 to confirm an amount of leased space available. In some embodiments, the respective lessor receives a storage request from server system 108 to store data associated with a lessee. For example, actual transfer of the data can either occur through server system 108 (e.g., lessee to server, then server to lessor) or directly from the lessee (e.g., peer-to-peer transfer). In some embodiments, the respective lessor receives a fetch request from server system 108 to fetch data. For example, the fetched data is sent to the lessee through server system 108 (e.g., lessor to server, then server to lessee) or directly to the lessee (e.g., peer-to-peer transfer). In some embodiments, the respective lessor receives an erase request from server system 108 to erase data. In response, the lessor erases the data specified by the erase request, including removing the specified data from its logical to physical mapping and putting the data on a queue to be subsequently erased or garbage collected. In some embodiments, the respective lessor receives a verification request from server system 108 to verify that the lessor is storing data associated with a previously services storage request (See FIGS. 7 and 11A-11B and accompanying text for further discussion).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long-Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. In some embodiments, client devices 104 are communicatively coupled with server system 108, at least in part, by a wireless communication network (e.g., network(s) 110) that is configured for both telephonic communications and data communications.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 9:
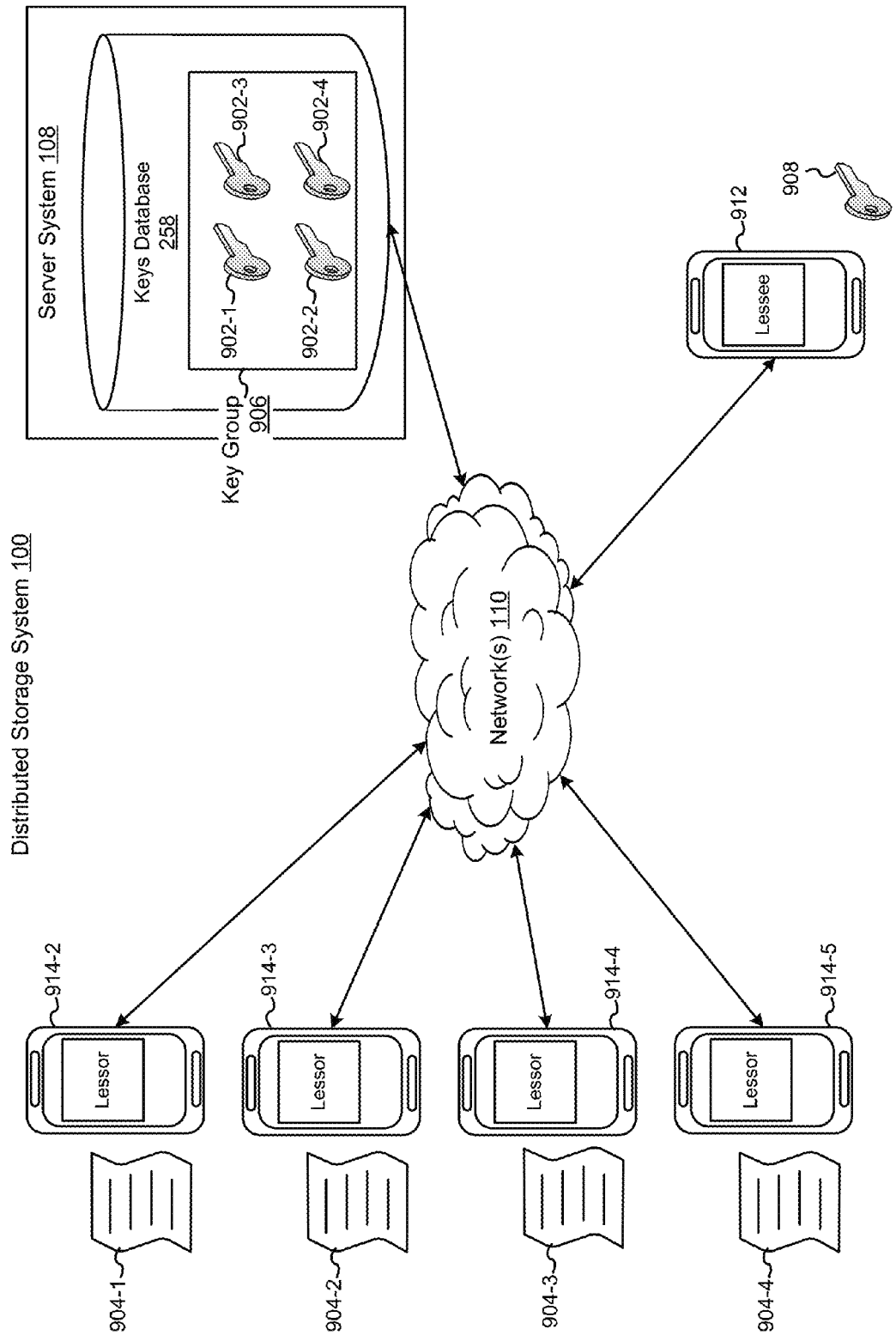
FIG. 9 is a diagram illustrating an implementation of a recovery process in accordance with some embodiments.
Figure 12A:
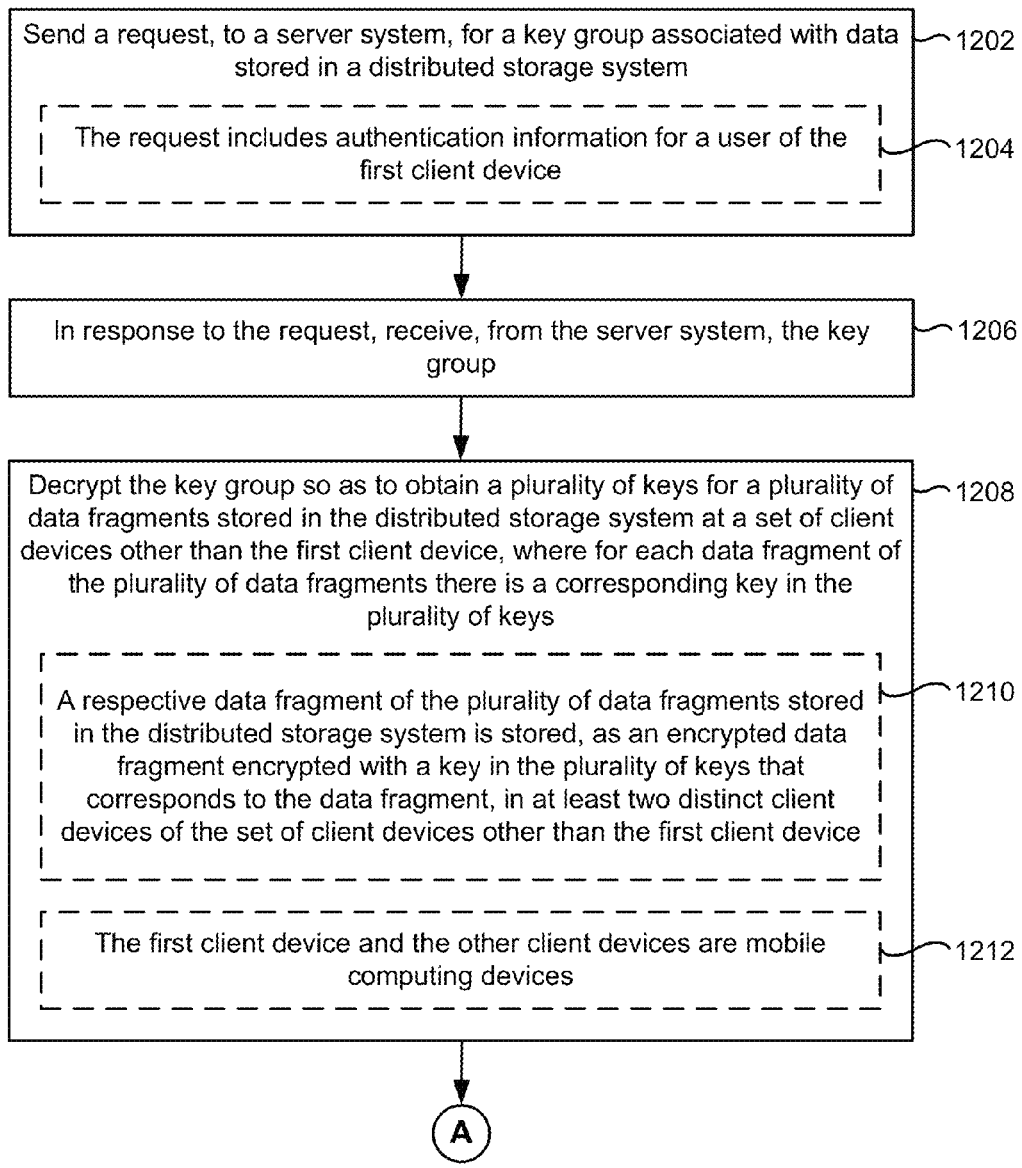
FIGS. 12A-12B illustrate a flowchart diagram of a method of recovering data stored in a distributed storage system in accordance with some embodiments.
Figure 12B:
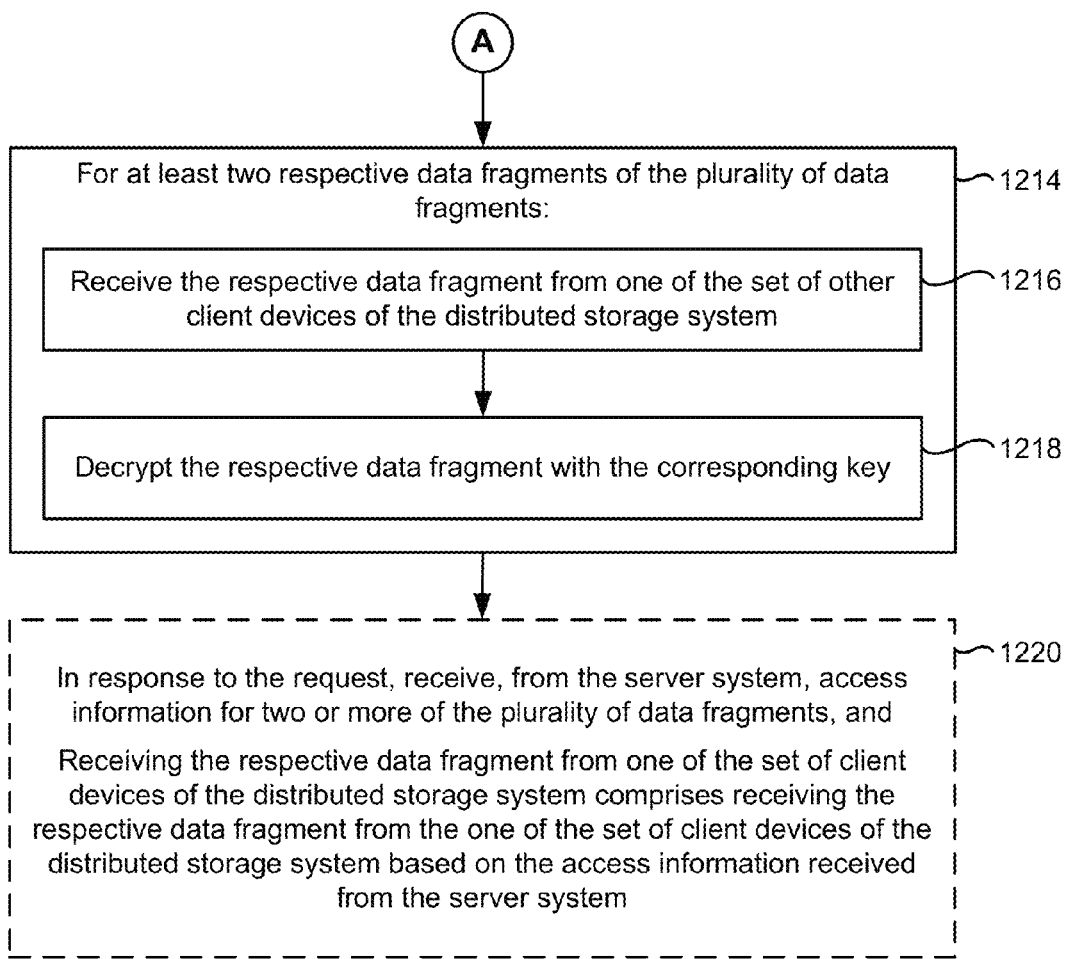

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, one or more 3D memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104) connected to one or more networks 110 via one or more network interfaces 204 (wired or wireless);
- server-side module 106, which provides server-side data processing for distributed storage system 100, and includes, but is not limited to:
  - management module 220 for operating and managing distributed storage system 100 including but not limited to performing analytics and accounting for determining compensation (e.g., money (monetary payment) due to lessors and money due from lessees of distributed storage system 100;
  - request handling module 222 for receiving requests from lessees, such as a request to store data in distributed storage system 100 (e.g., one or more files) or a request to fetch or erase data stored in distributed storage system 100, and issuing requests to lessors such as a request to store data, a request to fetch or erase data, or a request to report and/or confirm available leased memory space;
  - storing module 224 for storing one or more copies of the data associated with the storage request in replicated data 114;
  - locality determination module 226 for determining a base location for users (e.g., lessees and lessors) of distributed storage system 100;
  - storage rating module 228 for determining a storage rating for each of the lessors in distributed storage system 100;
  - matching module 230 for matching the lessee with one or more lessors that satisfy storage criteria included in a user profile of the lessee;
  - (optionally) cryptography module 232 for encrypting data received from the lessee and, optionally, decrypting data fetched from the one or more lessors;
  - fragmenting module 234 for dividing the data into one or more data fragments and maintaining fragment map 116;
  - distribution module 236 for distributing the one or more data fragments to the one or more matched lessors;
  - verification module 238 for issuing verification requests to lessors and determining whether a verification value received from the lessors matches a corresponding verification value in verification table 252; and
  - authentication module 240 for authenticating users of distributed storage system 100 by determining whether received login credentials (e.g., user name and password) match stored login credentials; and
- server data 250, including but not limited to:
  - (optionally) replicated data 114 storing one or more copies of the data associated with the storage request from the lessee, where the data is also stored by one or more lessors; in some implementations, replicated data 114 is data temporarily stored by server system 108 while servicing data storage and data retrieval requests, while in other implementations replicated data 114 includes data retained for longer periods of time;
  - fragment map 116 mapping data fragments of data stored in distributed storage system 100 to lessor(s) storing the data fragments so as to track data stored in distributed storage system 100 (See FIG. 4 and accompanying text for further discussion);
  - verification table 252 associating data blocks (sometimes also herein called "data fragments") stored in distributed storage system 100 with verification data and lessor(s) storing the data blocks, where verification data for a respective data block includes one or more sub-entries each including one or more verification parameters and a corresponding verification value (See FIG. 8 and accompanying text for further discussion);
  - lessee profile database 254 including profiles for one or more lessees in distributed storage system 100 (See FIG. 5A and accompanying text for further discussion);
  - lessor profile database 256 including profiles for one or more lessors in distributed storage system 100 (See FIG. 5B and accompanying text for further discussion); and
  - (optionally) key group database 258 stores encrypted group keys for lessees of distributed storage system 100, where an encrypted key group includes a plurality of encrypted sub-keys to data fragments stored in distributed storage system 100 (See FIGS. 9 and 12A-12B and accompanying text for further discussion).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of information and media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, one or more 3D memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

operating system 316 including procedures for handling various basic system services and for performing hardware dependent tasks;

network communication module 318 for connecting client device 104 to other computing devices (e.g., server system 108) connected to one or more networks 110 via one or more network interfaces 304 (wired or wireless);

presentation module 320 for enabling presentation of information (e.g., user interfaces for widgets, websites and web pages thereof, games, and/or applications, audio and/or video content, text, etc.) at client device 104 via one or more output devices 312 (e.g., displays, speakers, etc.) associated with user interface 310;

input processing module 322 for detecting one or more user inputs or interactions from one of the one or more input devices 314 and interpreting the detected input or interaction;

web browser module 324 for navigating, requesting (e.g., via HTTP), and displaying websites and web pages thereof;

one or more applications 326-1-326-N for execution by client device 104 (e.g., games, application marketplaces, payment platforms, and/or other applications); and client-side module 102, which provides client-side data processing and functionalities for distributed storage system 100, including but not limited to:

lessee module 330 for performing functions corresponding to a lessee in distributed storage system 100, including but not limited to:

request handling module 332 for issuing, to server system 108, requests to store, fetch, or erase data;

cryptography module 334 for encrypting data to be stored in distributed storage system 100 and decrypting data fetched from lessors of distributed storage system 100;

(optionally) fragmenting module 336 for dividing the data to be stored in distributed storage system 100 into one or more data fragments;

transmitting module 338 for transmitting, to server system 108 (or directly to one or more lessors), data to be stored in distributed storage system 100, where the data is associated with a storage request;

obtaining module 340 for obtaining, from server system 108 (or directly from one or more lessors), data stored in distributed storage system 100, where the data corresponds to a fetch request; and recovery module 342 for performing a recovery process to recover data stored in distributed storage system 100 (See FIG. 9 and accompanying text for further discussion); and lessor module 350 for performing functions corresponding to a lessor in distributed storage system 100, including but not limited to:

request handling module 352 for (a) handling requests from server system 108 to store, fetch, or erase data and (b) responding to requests to report and/or confirm available leased memory space from server system 108;

storing module 354 for storing lessee data (e.g., an encrypted data fragment of the lessee's data) received from server system 108 or directly from the lessee in leased space 376 in response to a storage request from server system 108;

fetching module 356 for fetching lessee data and providing the lessee data to server system 108 or directly to the lessee in response to a fetch request from server system 108;

erasing module 358 for erasing lessee data stored in leased space 376 in response to an erase request from server system 108; and verifying module 360 for performing a verification process as to a data block specified by a verification request from server system 108 and providing a verification value to server system 108 in response to the verification request;

client data 370, including, but is not limited to:

user profile 372 storing a user profile associated with the user of client device 104 including a user/account identifier, payment data (e.g., linked credit card or banking information for debiting/crediting based on usage of distributed storage system 100 as a lessee and/or lessor), custom parameters (e.g., age, location, hobbies, etc.) for the user, and identified trends and/or likes/dislikes of the user;

user data 374 storing data and files associated with the user of client device 104; and leased space 376 storing encrypted data fragments for lessees in distributed storage system 100 and also available leased memory space.

In some implementations, a particular client 104 that operates only as a lessee includes lessee module 330 but not lessor module 350. In some implementations, a particular client 104 that operates only as a lessor includes lessor module 350 but not lessee module 330.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by a respective client device 104, and the corresponding sub-modules of these functions may be located within the respective client device 104 rather than server system 108. In some embodiments, at least some of the functions of a respective client device 104 are performed by server system 108, and the corresponding sub-modules of these functions may be located within server system 108 rather than the respective client device 104. Representative client device 104 and server system 108 shown in FIGS. 2-3, respectively, are merely illustrative, and different configurations of the modules for implementing the functions described herein are possible in various embodiments.

Figure 4:
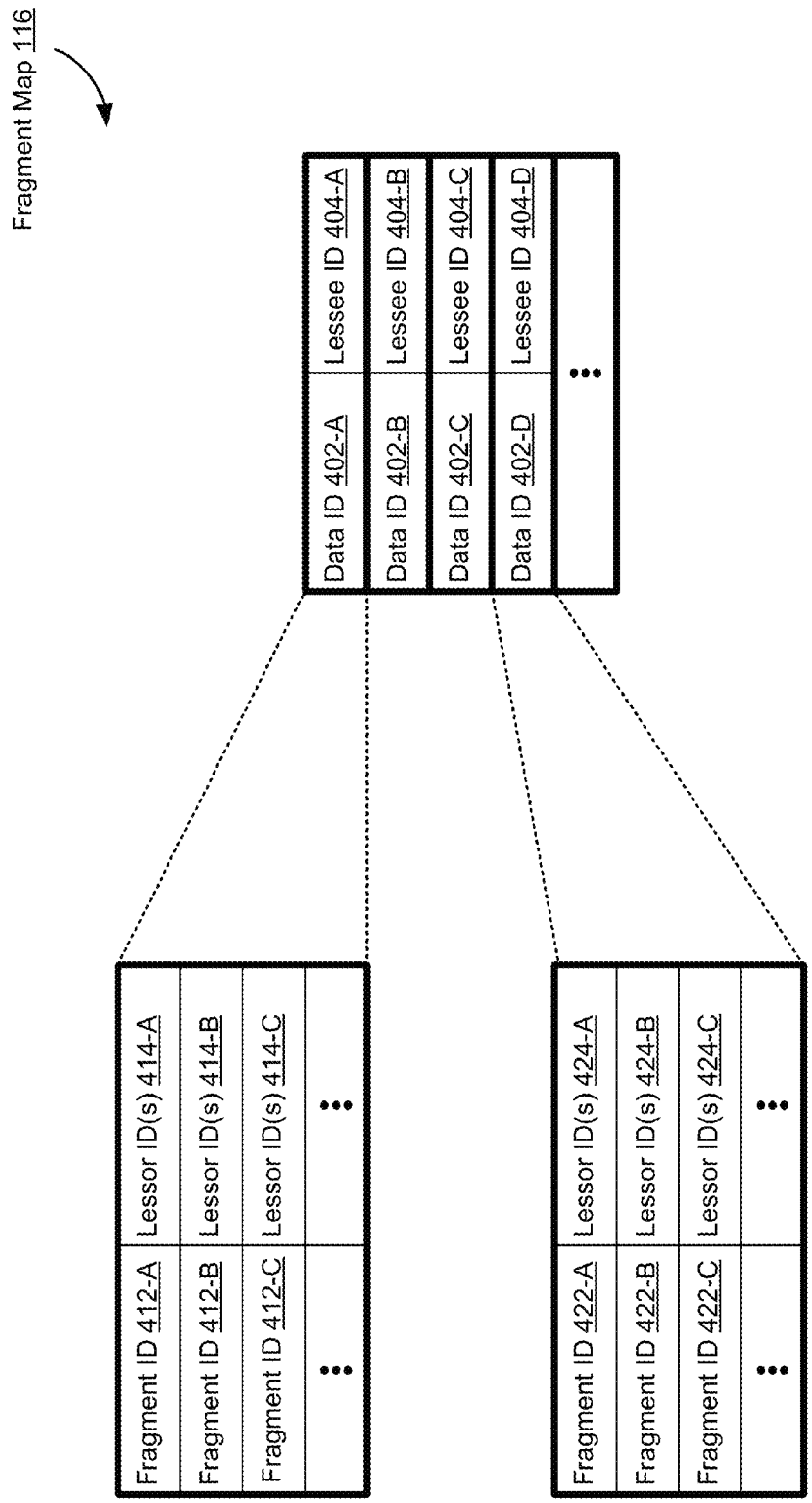
FIG. 4 is a block diagram of an implementation of a fragment map for tracking data stored in the distributed storage system in accordance with some embodiments.

FIG. 4 is a block diagram of an implementation of a data structure representing a fragment map 116 for tracking data stored in distributed storage system 100 in accordance with some embodiments. In some embodiments, server system 108 operates and manages distributed storage system 100 whereby users (i.e., lessees) of distributed storage system 100 store data in a portion of the memory of client devices 104 associated with other users (i.e., lessors) in distributed storage system 100. In some embodiments, fragment map 116 is stored and managed by server system 108 or a component thereof (e.g., fragmenting module 232, FIG. 2). In some embodiments, fragment map 116 is stored remote from server system 108 but is managed by server system 108.

In some embodiments, fragment map 116 includes a plurality of entries each with a data identifier 402 and a lessee identifier 404. For example, a lessee stores data (e.g., one or more files) in distributed storage system 100. In this example, a respective data identifier 402 is a unique identifier associated with the data. Continuing with this example, a respective lessee identifier 404 is a unique identifier for the lessee storing the data corresponding to respective data identifier 402 in distributed storage system 100. For example, respective lessee identifier 404 is a number or sequence of characters or other value associated with the lessee or a user name or account associated with the lessee.

In some embodiments, each entry of fragment map 116 is linked to a set of sub-entries, where each sub-entry includes a fragment identifier and one or more lessor identifiers. For example, the data associated with respective data identifier 402-D is divided into data fragments (sometimes also herein called "data blocks") corresponding to data fragment identifiers 422-A, 422-B, 422-C, . . . and each data fragment is stored by one or more lessors in distributed storage system 100 corresponding to lessor identifiers 424-A, 424-B, 424-C, . . . , respectively. For example, a respective lessor identifier is a number or sequence of characters or other value associated with a lessor or a user name or account associated with the lessor.

As one example, a lessee issues a storage request to server system 108, and, prior to providing data associated with the storage request to server system 108, the lessee encrypts the data with a master key. Subsequently, in this example, server system 108 obtains the encrypted data. In some embodiments, server system 108 stores a copy of the encrypted data in replicated data 114. In response to obtaining the encrypted data, server system 108 creates an entry in fragment map 116 for the encrypted data. With reference to FIG. 4, data ID 402-A is a unique identifier associated with the encrypted data and lessee ID 404-A is a unique identifier associated with the lessee.

Continuing with this example, after receiving the encrypted data associated with the storage request, server system 108 fragments the encrypted data into a plurality of data fragments and, in some circumstances, encrypts each data fragment with a server-side sub-key. Continuing with this example, server system 108 matches the lessee with one or more lessors based on the lessee's storage criteria and the one or more lessors' storage ratings. Subsequently, in this example, at least one of the data fragments is stored by each of the one or more matched lessors, and server system 108 notes the one or more lessors storing each data fragment in fragment map 116. With reference to FIG. 4, fragment ID 412-A is a unique identifier for a first data fragment of the one or more data fragments and lessor IDs 414-A are one or more unique identifiers, each of which identifies a lessor storing the first data fragment.

Continuing with this example, at a time after issuing the storage request, the lessee issues a fetch request to server system 108 for the data. In this example, server system 108 determines the one or more lessors storing the data by mapping, with fragment map 116, a data ID (e.g., data ID 402-A) for the encrypted data associated with the fetch request to corresponding data fragments (e.g., data fragments corresponding to fragment IDs 412-A, 412-B, 412-C, . . . ) and the one or more lessors storing the data fragments (e.g., lessors corresponding to lessor IDs 414-A, 414-B, 414-C, . . . ). Continuing with this example, server system 108 retrieves the data fragments from the one or more lessors and decrypts the data fragments with the server-side sub-keys. Continuing with this example, server system 108 provides the data to the lessee, and the lessee decrypts the data with the master key.

FIG. 5A is a block diagram of an implementation of a data structure representing a user profile 500 for a lessee in distributed storage system 100 in accordance with some embodiments. In some embodiments, the lessee is a user of distributed storage system 100 who stores data in distributed storage system 100. For example, server system 108 distributes the lessee's data to lessors who store the data (or a portion thereof) in a portion of the memory of their respective client devices 104 (e.g., leased space 376, FIG. 3). In some embodiments, user profile 500 corresponds to a user profile stored in lessee profile database 254 (FIG. 2). In some embodiments, user profile 500 for a lessee in distributed storage system 100 includes the following fields: user identifier field 502; base location field 504; temporary location(s) field 506; and storage criteria field 508.

In some embodiments, user profile 500 field includes a unique user identifier 502 for the lessee. For example, user ID 502 is a unique number generated by server system 108 for the lessee or user ID 502 is a user name or account name associated with distributed storage system 100 for the lessee.

In some embodiments, base location 504 field includes a home or base location for the lessee. For example, server system 108 or a component thereof (e.g., locality determination module 226, FIG. 2) determines an address or absolute set of coordinates (e.g., longitudinal and latitudinal coordinates) where the lessee is most frequently located (e.g., based on GPS, WiFi, or other positioning means of client device 104 associated with the lessee) or where the lessee most frequently issues storage, fetch, and erase requests.

In some embodiments, temporary location(s) field 506 includes one or more temporary locations associated with the lessee. For example, a temporary location is a vacation destination or secondary location specified by the lessee that is different from the lessee's base location.

In some embodiments, storage criteria 508 field includes criteria specified by the lessee that a lessor must satisfy in order for the lessee's data to be stored by the lessor. For example, the storage criteria include one or more of (or two or more of): a minimum storage rating, minimum amount of uptime, a minimum amount of available leased space, a maximum distance from the lessee's base location, a maximum latency for servicing/responding to requests, minimum upload speed, and minimum download speed.

FIG. 5B is a block diagram of an implementation of a data structure representing a user profile 550 for a lessor in distributed storage system 100 in accordance with some embodiments. In some embodiments, the lessor is a user of distributed storage system 100 who stores data (or a portion thereof) for one or more lessees in a portion of the memory of their respective client devices 104 (e.g., leased space 376, FIG. 3). In some embodiments, user profile 550 corresponds to a user profile stored in lessor profile database 256 (FIG. 2). In some embodiments, user profile 550 for a lessor in distributed storage system 100 includes the following fields: user identifier field 552; base location field 554; temporary location(s) field 556; leased space field 558; and storage rating field 560.

In some embodiments, user profile 550 field includes a unique user identifier 552 for the lessor. For example, user ID 552 is a number generated by server system 108 for the lessor or user ID 552 is a user name or account name associated with distributed storage system 100 for the lessor.

In some embodiments, base location 554 field includes a home or base location for the lessor. For example, server system 108 or a component thereof (e.g., locality determination module 226, FIG. 2) determines an address or absolute set of coordinates (e.g., longitudinal and latitudinal coordinates) where the lessor is most frequently located (e.g., based on GPS, WiFi, or other positioning means of client device 104 associated with the lessor) or most frequently services (or responds to) storage, fetch, and erase requests.

In some embodiments, temporary location(s) field 566 includes one or more temporary locations associated with the lessor. For example, a temporary location is a vacation destination or secondary location specified by the lessor that is different from the lessor's base location.

In some embodiments, leased space field 558 includes a total amount of leased space and a current amount of leased space available. For example, a lessor leases out 4 GB of the memory of a client device 104 associated with the lessor, and the lessor is currently storing 3.5 GB of lessee data. In this example, leased space field 558 in user profile 550 for the lessor indicates that the total amount of leased space is 4 GB and that 0.5 GB of leased space is currently available.

In some embodiments, storage rating field 560 indicates a storage rating for the lessor. In some embodiments, server system 108 or a component thereof (e.g., storage rating module 228, FIG. 2) determines a storage rating for each of the lessors in distributed storage system 100. In some embodiments, storage rating module 228 determines a storage rating for a respective lessor based on a predefined algorithm that takes into account a combination of factors corresponding to the respective lessor such as two or more of: average daily uptime (e.g., the amount of time lessee data is accessible), a data loss factor (e.g., (amount of data lost*length of time data stored)/total amount of data stored), total amount of leased space, average upload and download speeds, a count of data tampering or detected viruses, average amount of time for servicing request (e.g., storage, fetch, and erase requests), and a withdrawal frequency (i.e., how often the respective lessor withdraws leased space for personal use).

Figure 6A:
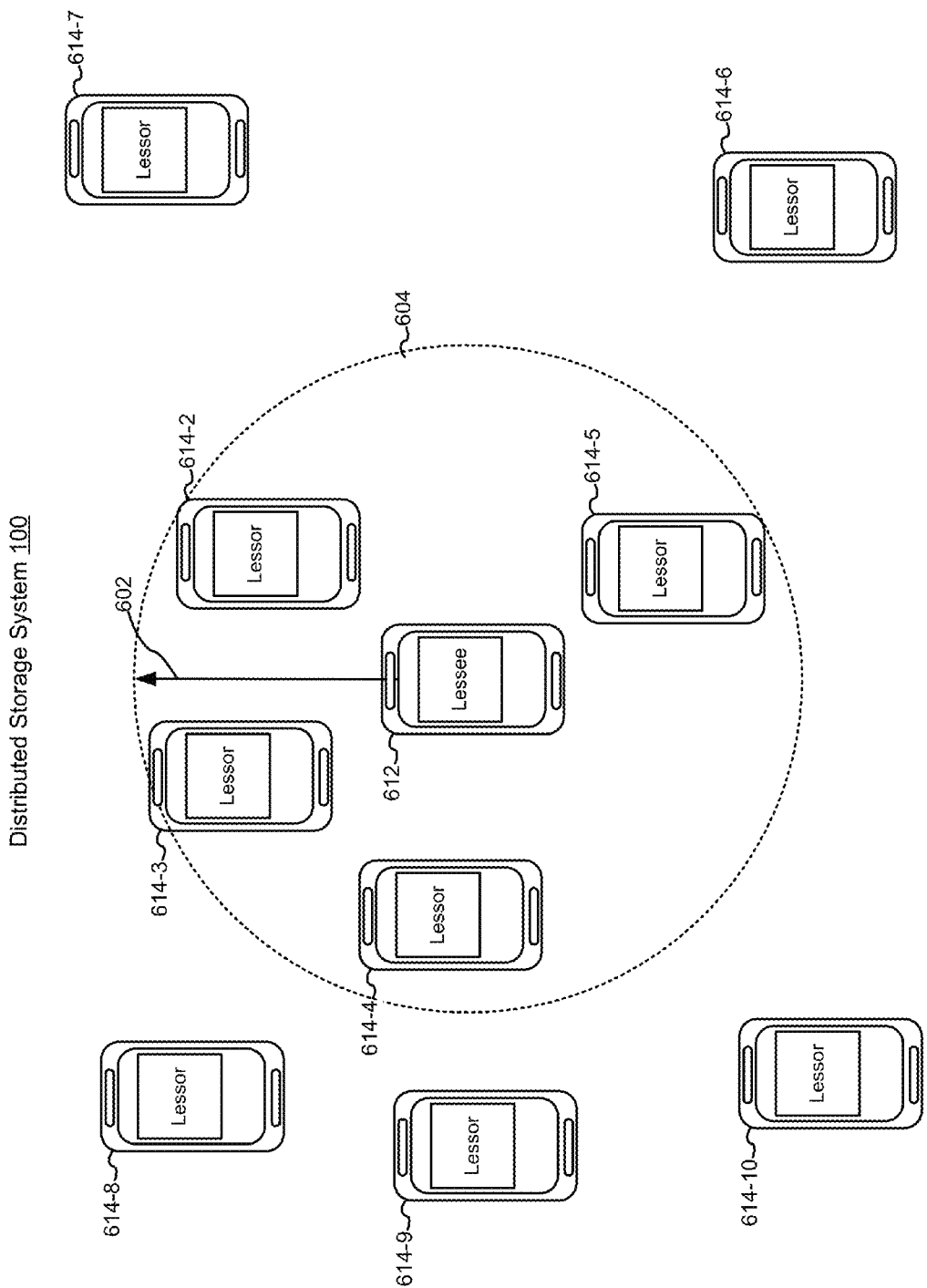
FIG. 6A is a diagram of an implementation for matching a lessee with one or more lessors in the distributed storage system in accordance with some embodiments.

FIG. 6A is a block diagram of a first implementation for matching a lessee with one or more lessors in the distributed storage system in accordance with some embodiments. FIG. 6A shows lessee 612 and a plurality of lessors 614-2, 614-4, 614-5, 614-6, 614-7, 614-8, 614-9, and 614-10 in distributed storage system 100. In some embodiments, server system 108 or a component thereof (e.g., locality determination module 226, FIG. 2) determines a base location for lessee 612 and each of the plurality of lessors 614-2, 614-3, 614-4, 614-5, 614-6, 614-7, 614-8, 614-9, and 614-10. FIG. 6A indicates the determined base locations for lessee 612 and each of the plurality of lessors 614-2, 614-3, 614-4, 614-5, 614-6, 614-7, 614-8, 614-9, and 614-10 (not shown to scale).

For example, storage criteria in a user profile associated with lessee 612 includes a maximum storage distance indicating that lessee 612 wishes his/her data to be stored by lessors whose base locations are within 10 km of his/her base location. FIG. 6A shows a dotted circle 604 with a center corresponding to the base location of lessee 612 and a radius 602 corresponding to the maximum storage distance (e.g., 10 km) specified by lessee 612. In some embodiments, server system 108 or a component thereof (e.g., matching module 230, FIG. 2) matches lessee 612 with one or more lessors based at least in part on the maximum storage distance. For example, in FIG. 6A, matching module 230 matches lessee 612 with lessors 614-2, 614-3, 614-4, and 614-5 as their base locations are within 10 km of lessee 612's base location.

Figure 6B:
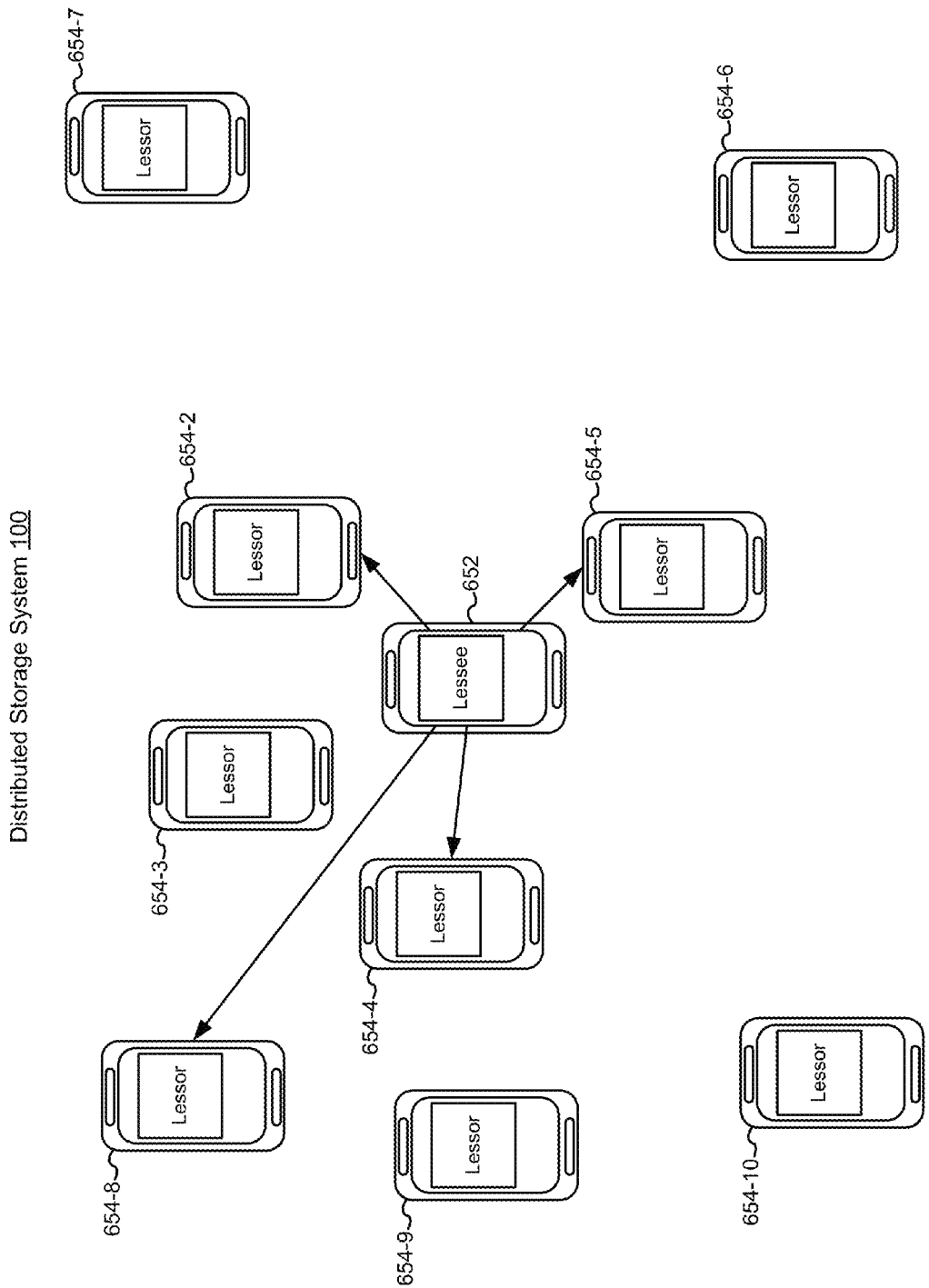
FIG. 6B is a diagram of an implementation for matching a lessee with one or more lessors in the distributed storage system in accordance with some embodiments.

FIG. 6B is a block diagram of a second implementation for matching a lessee with one or more lessors in the distributed storage system in accordance with some embodiments. FIG. 6B shows lessee 652 and a plurality of lessors 654-2, 654-3, 654-4, 654-5, 654-6, 654-7, 654-8, 654-9, and 654-10 in distributed storage system 100. In some embodiments, server system 108 or a component thereof (e.g., locality determination module 226, FIG. 2) determines a base location for lessee 652 and each of the plurality of lessors 654-2, 654-3, 654-4, 654-5, 654-6, 654-7, 654-8, 654-9, and 654-10. FIG. 6B indicates the determined base locations for lessee 652 and each of the plurality of lessors 654-2, 654-3, 654-4, 654-5, 654-6, 654-7, 654-8, 654-9, and 654-10 (not shown to scale).

For example, storage criteria in a user profile associated with lessee 652 includes a maximum latency indicating that lessee 652 wishes his/her data to be stored by lessors that satisfy a predefined latency criterion. In this example, the predefined latency criterion is satisfied when the amount of time (or latency) between issuance of a request (e.g., a storage, fetch, or erase request) by lessee 652 and service of the request by a lessor is less than a predetermined amount of time. In some embodiments, server system 108 or a component thereof (e.g., matching module 230, FIG. 2) matches lessee 652 with one or more lessors based at least in part on the predefined latency criterion. For example, in FIG. 6B, matching module 230 matches lessee 652 with lessors 654-2, 654-4, 654-5, and 654-8 as the amount of time (or latency) between issuance of a request (e.g., a storage, fetch, or erase request) by lessee 652 and service of the request by lessors 654-2, 654-4, 654-5, and 654-8 is less than the predetermined amount of time corresponding to the predefined latency criterion.

Figure 7:
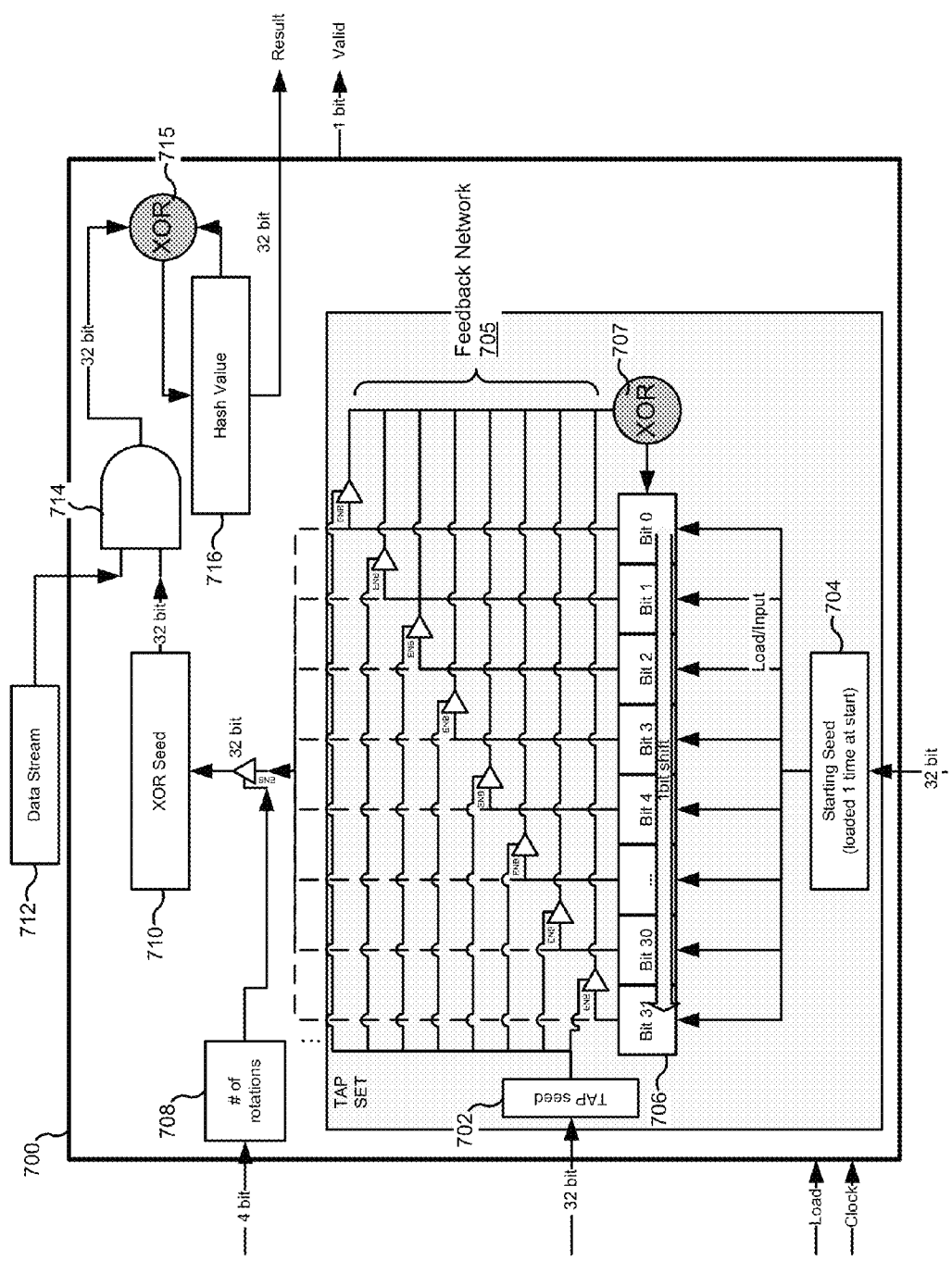
FIG. 7 is a schematic block diagram of an implementation of a verification circuit in accordance with some embodiments.

FIG. 7 is a schematic block diagram of a verification circuit 700 in accordance with some embodiments. Verification circuit 700 is a schematic example of a circuit for performing a verification process. In some embodiments, verification circuit 700 is implemented in hardware, firmware, software (e.g., verifying module 360, FIG. 3), or a combination thereof. In FIG. 7, a hardware implementation of verification circuit 700 is schematically illustrated for ease of discussion.

For example, a client device 104 associated with a lessor in distributed storage system 100 receives a verification request (sometimes also herein called a "storage challenge")

from server system 108 to verify storage of a specified data block (e.g., a particular data fragment stored in leased space 376), where the verification request includes one or more verification parameters. In some embodiments, the one or more verification parameters include one or more of: a starting seed 704 (e.g., 32 bits), a TAP seed 702 (e.g., 32 bits), and a rotation value 708 (e.g., 4 bits). In implementations that use less than all three of these parameters, the other parameters have default values, or verification circuit 700 is configured with the equivalent of fixed values for the other parameters. In response to receiving the verification request, client-side module 102 or a component thereof (e.g., verifying module 360, FIG. 3) executed on client device 104 associated with the lessor performs a verification process to produce a verification value based on the one or more verification parameters and the specified data block.

At the start of the verification process, starting seed 704 is loaded, according to a loading signal, into the registers of linear feedback shift register (LFSR) 706, and TAP seed 702 enables corresponding lines of feedback network 705. In some embodiments, feedback network 705 includes a number of lines equal to the maximum TAP seed size or the maximum size of LFSR 706 such as 32 lines. After a first clock cycle, the initial bits in LFSR 706 (e.g., starting seed 704) that correspond to the enabled lines of feedback network 705 serve as inputs to XOR gate 707. In some embodiments, XOR gate 707 includes a number of inputs equal to the maximum TAP seed size or the maximum size of LFSR 706 such as 32 inputs. Furthermore, in a first clock cycle, the initial bits in LFSR 706 (e.g., starting seed 704) are shifted to the left by 1 bit and the output of XOR gate 707 is loaded into the 0th bit of LFSR 706. Continuing with this example, in a second clock cycle, the bits in LFSR 706 that correspond to enabled lines of feedback network 705 serve as inputs to XOR gate 707 (e.g., an XOR gate with 32 inputs). Furthermore, the initial bits in LFSR 706 are again shifted to the left by 1 bit and the output of XOR gate 707 is loaded into the 0th bit of LFSR 706.

In some embodiments, rotation value 708 indicates a number of clock cycles after which the bits in LFSR 706 are loaded into XOR seed 710. For example, if rotation value 708 indicates four clock cycles, the above described shifting process is repeated for four clock cycles and, subsequently, the bits in LFSR 706 are loaded into XOR seed 710.

In some embodiments, XOR seed 710 is AND'ed with data stream 712 (e.g., the specified data block or a portion thereof) via AND gate 714. In some embodiments, hash value 716 is a cumulative value computed by XOR'ing the previous hash value 716 with the output of AND gate 714 via XOR gate 715. In some embodiments, after the specified data block has been processed, the verification process ends and the result (or verification value) is current hash value 716.

FIG. 8 is a block diagram of an implementation of a data structure representing a verification table 252 for verifying storage of data blocks in distributed storage system 100 in accordance with some embodiments. In some embodiments, verification table 252 is populated and stored by server system 108. In some embodiments, verification table 252 is stored in a memory that is communicatively coupled with and managed by server system 108 but remotely located from server system 108.

In some embodiments, verification table 252 includes an entry for each data block (or data fragment) stored in distributed storage system 100. In FIG. 8, a respective entry in verification table 252 includes a data block identifier 802 for a corresponding data block (i.e., a data fragment) stored in distributed storage system 100, one or more locations 804 corresponding to lessors storing the data block (e.g., one or more locations 804 includes identifiers corresponding to the lessors), and verification data 806 associated with the data block.

In some embodiments, each entry of verification table 252 is linked to a set of one or more sub-entries, where a respective sub-entry includes verification parameters 812 and a corresponding verification value 814. In some embodiments, verification parameters 812 include a TAP seed 822, a starting seed 824, and a specified number of rotations 826 for producing a custom generator polynomial. In some embodiments, verification value 814 corresponds to a hash value resulting from a verification process performed on a respective data block corresponding to data block identifier 802 and the custom generator polynomial produced from verification parameters 812.

In some embodiments, server system 108 or a component thereof (e.g., verification module 238, FIG. 2) generates a plurality of distinct sub-entries for each data block stored in distributed storage system 100. In some embodiments, verification module 238 generates the plurality of distinct sub-entries for a respective data block prior to storing the respective data block in distributed storage system 100, prior to issuing a verification request as to the respective data block, or on-the-fly when issuing a verification request as to the respective data block. In some embodiments, after exhausting the plurality of distinct sub-entries by issuing a corresponding number of verification requests, verification module 238 generates a new plurality of distinct sub-entries for subsequent verification requests. In this way, lessors are not able to synthesize a verification value based on the verification parameters in a verification request without performing the verification process.

Stated another way, lessors cannot know, in advance of receiving a verification request, the set or combination of verification parameters values that will be included in the verification request, and thus cannot compute the corresponding verification value prior to receiving the verification request. In this way, cheating by lessors (i.e., not storing data that they have agreed to store) is prevented, because the lessors know that they will have to respond to verification requests with unpredictable verification parameters, or such cheating is detected when the lessor either returns an incorrect verification value in response to a verification request, or fails to respond to the request.

In one example, server system 108 or a component thereof (e.g., verification module 238, FIG. 2) issues a verification request to one of the lessors identified by locations 804-N for a data block corresponding to data block identifier 802-N. In this example, the verification request includes verification parameters 812-A. Continuing with this example, server system 108 or a component thereof (e.g., verification module 238, FIG. 2) receives verification values from the one or more lessors in response to the verification request. In this example, server system 108 or a component thereof (e.g., verification module 238, FIG. 2) compares a verification value received from a respective lessor against verification value 814-A. In accordance with a determination that the verification value received from the respective lessor matches verification value 814-A, server system 108 confirms that the respective lessor is storing the data block associated with the verification request. In accordance with a determination that the verification value received from the respective lessor does not match verification value 814-A, server system 108 reduces the storage rating of the respective lessor (as the respective lessor is no longer storing the data block associated with the verification request) and increments a count of failed storage challenges for the respective lessor. For example, when the count of failed storage challenges for the respective lessor exceeds a predetermined count, the respective lessor is barred from participating in distributed storage system 100 as a lessor. In some embodiments, the predetermined count factors for memory malfunctions associated with the client device 104 which are not associated with malfeasance by the lessor.

FIG. 9 is a diagram illustrating an implementation of a recovery process in accordance with some embodiments.

As one example, a lessee 912 intends to store respective data (e.g., one or more files) in distributed storage system 100 so as to backup the respective data in case of the loss or reformatting of his/her client device 104. In order to store the respective data in distributed storage system 100, lessee 912 executes client-side module 102, which provides client-side functions for distributed storage system 100 and facilitates communication with server system 108, on a client device 104 associated with lessee 912. In some embodiments, client-side module 102 or a component thereof (e.g., fragmenting module 336, FIG. 3) divides the respective data into a plurality of data fragments 904-1, 904-2, 904-3, and 904-4, and client-side module 102 or a component thereof (e.g., cryptography module 338, FIG. 3) encrypts each of the plurality of data fragments with a distinct sub-key (e.g., sub-keys 902-1, 902-2, 902-3, and 902-4). Subsequently, client-side module 102 or a component thereof (e.g., cryptography module 338, FIG. 3) generates a key group 906 by encrypting the distinct sub-keys 902-1, 902-2, 902-3, and 902-4 associated with the plurality of data fragments 904-1, 904-2, 904-3, and 904-4 with a master key 908 (e.g., a plain text password).

Thereafter, client-side module 102 or a component thereof (e.g., request handling module 332, FIG. 3) issues a storage request to server system 108 and sends encrypted key group 906 to server system 108 for storage. For example, server system 108 stores key group 906 in key group database 258 (FIG. 2). Subsequently, in this example, server system 108 obtains the encrypted data fragments 904-1, 904-2, 904-3, and 904-4 and matches lessee 912 with lessors 914-2, 914-3, 914-4, and 914-5 based on storage criteria specified in a user profile corresponding to lessee 912 and the storage ratings for lessors 914-2, 914-3, 914-4, and 914-5. Subsequently, in this example, at least one of the data fragments is stored by each of lessors 914-2, 914-3, 914-4, and 914-5, and server system 108 notes in fragment map 116 that lessor 914-2 is storing data fragment 904-1, lessor 914-3 is storing data fragment 904-2, lessor 914-4 is storing data fragment 904-3, and lessor 914-5 is storing data fragment 904-4.

Thereafter, for example, after issuing the storage request with respect to the respective data, lessee 912 loses his/her client device 104. After obtaining a new client device 104, lessee 912 downloads client-side module 102 from an application marketplace and logins into distributed storage system 100 using his/her previously established login credentials so as to authenticate lessee 912. Thereafter, lessee 912 requests key group 906 from server system 108 so as to recover the respective data associated with key group 906. Lessee 912 obtains key group 906 from server system 108 and decrypts key group 906 with master key 908 (e.g., a plain text password) so as to obtain sub-keys 902-1, 902-2, 902-3, and 902-4 for data fragments 904-1, 904-2, 904-3, and 904-4, respectively. In some embodiments, lessee 912 recovers the respective data by issuing a fetch request to server system 108, obtaining data fragments 904-1, 904-2, 904-3, and 904-4, and decrypting data fragments 904-1, 904-2, 904-3, and 904-4 with sub-keys 902-1, 902-2, 902-3, and 902-4.

In some embodiments, lessee 912 also obtains location information from server system 108 indicating unique identifiers for and/or the locations of lessors 914-2, 914-3, 914-4, and 914-5 storing data fragments data fragments 904-1, 904-2, 904-3, and 904-4, respectively. To this end, lessee 912 obtains data fragments 904-1, 904-2, 904-3, and 904-4 directly from lessors 914-2, 914-3, 914-4, and 914-5, respectively, according to the location information.

In some implementations, the devices that perform various ones of the encryption steps are different from that just described above. For example, in some implementations, lessee 912 encrypts the data to be stored with a master key, server system 108 divides the encrypted data into a plurality of data fragments, encrypts the data fragments with respective sub-keys, and then sends the resulting to respective lessors 914 for storage. When fetching or restoring the saved data, this process is run in reverse. In particular, server system 108 fetches data fragments from lessors 914 identified using the fragment map, decrypts the data fragments using the sub-keys, and sends the resulting data to the lessee for decryption using the master key (or a decryption key corresponding to the master key if non-symmetric encryption/decryption is used) to recover the stored data. In both implementations, and in many other implementations, data stored by lessors 914 on behalf of lessee 912 is encrypted and cannot be fully decrypted without a master key known only to lessee 912.

Figure 10A:
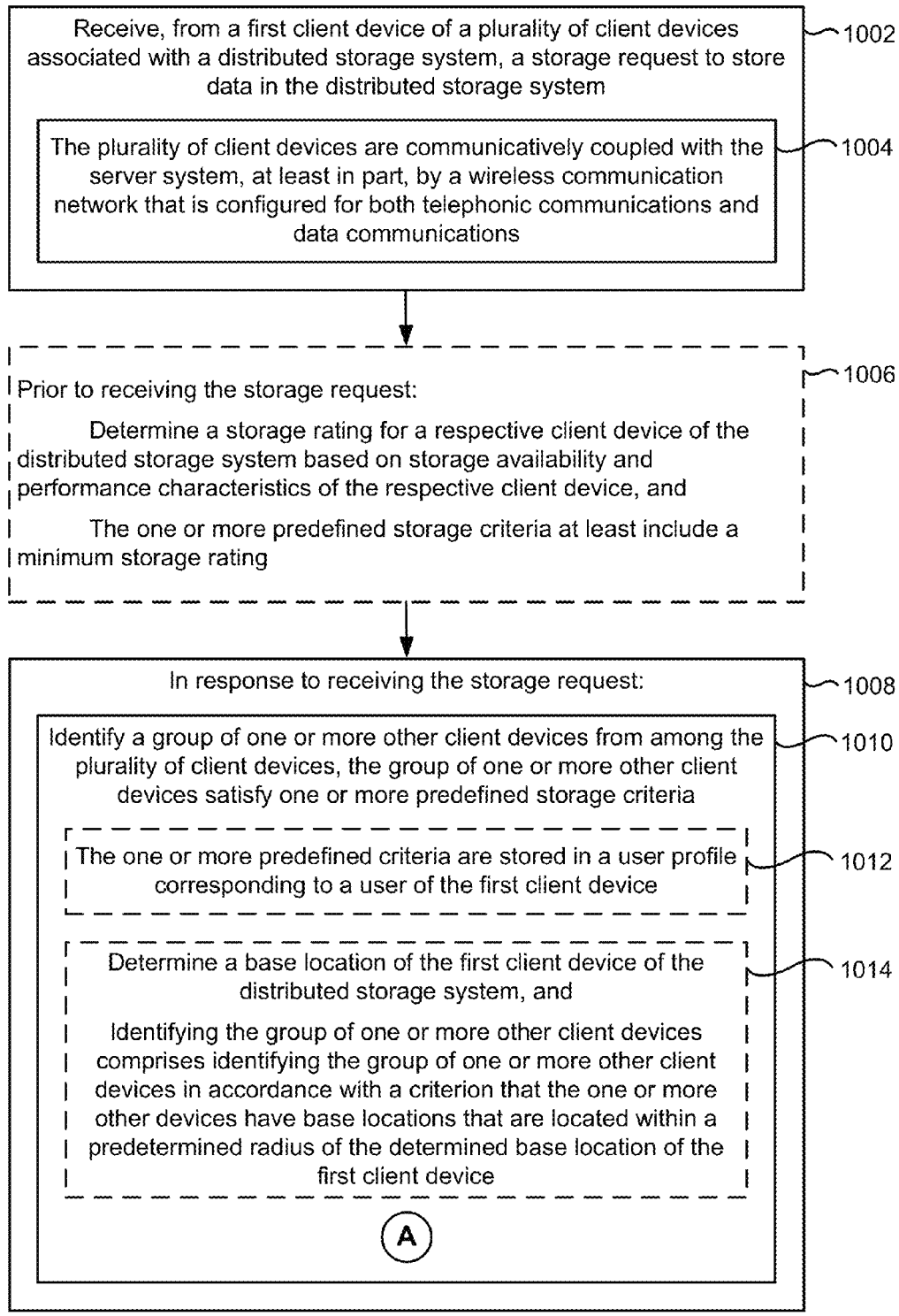
FIGS. 10A-10B illustrate a flowchart diagram of a method of storing data in the distributed storage system in accordance with some embodiments.
Figure 10B:
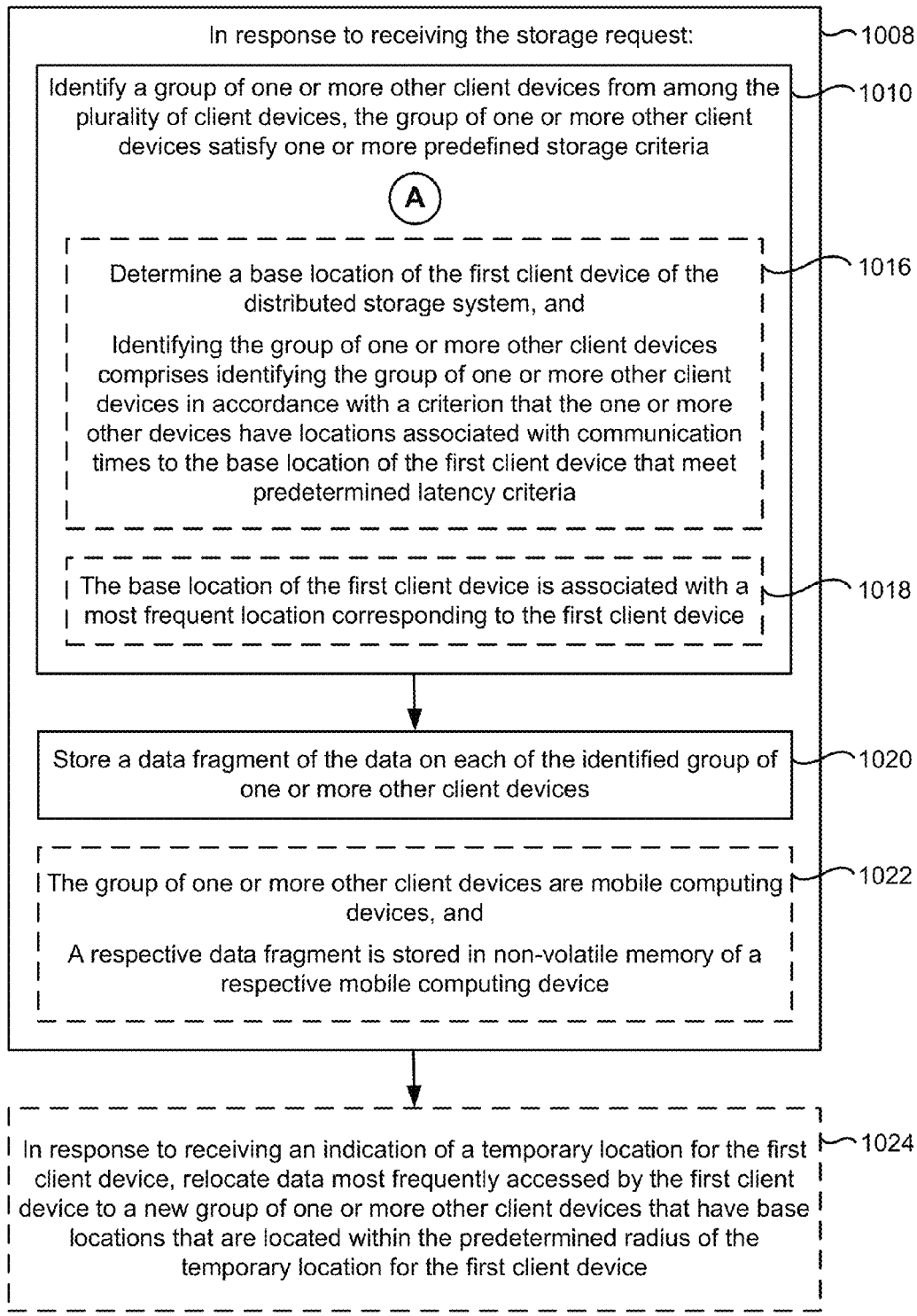

FIGS. 10A-10B illustrate a flowchart diagram of a method 1000 of storing data in distributed storage system 100 in accordance with some embodiments. In some embodiments, distributed storage system 100 includes a server system and a plurality of client devices. In some embodiments, method 1000 is performed by the server system that includes one or more processors and memory. For example, in some embodiments, method 1000 is performed by server system 108 (FIGS. 1-2) or a component thereof (e.g., server-side module 106, FIGS. 1-2). In some embodiments, method 1000 is governed by instructions that are stored in a non-transitory computer readable storage medium and the instructions are executed by one or more processors of the server system. Optional operations are indicated by dashed lines (e.g., boxes with dashed-line borders).

The server system receives (1002), from a first client device of the plurality of client devices, a storage request to store data in the distributed storage system. In some embodiments, server system 108 or a component thereof (e.g., request handling module 222, FIG. 2) receives a storage request from a first client device 104 associated with a user of distributed storage system 100 (i.e., a lessee) to store respective data (e.g., one or more files) in distributed storage system 100. For example, the user wishes to store the respective data (e.g., important files) in distributed storage system 100 so as to quickly access the remotely stored data, to act as a backup the data in case his/her device dies, or to act as a replica copy of the data for access on alternate devices.

The plurality of client devices are (1004) communicatively coupled with the server system, at least in part, by a wireless communication network that is configured for both telephonic communications and data communications. For example, with reference to FIG. 1, distributed storage system 100 includes a plurality of client devices 104, including the first client device 104 associated with a user of distributed storage system 100 (i.e., the lessee), and server system 108 communicatively coupled through one or more networks 110. One or more networks 110 are implemented using any known wireless networking protocol that is configured for both telephonic communications and data communications such as Long-Term Evolution (LTE), Global System for Mobile Communications (GSM), Enhanced Data GSM Environment (EDGE), code division multiple access (CDMA), time division multiple access (TDMA), Wi-Fi, voice over Internet Protocol (VoIP), Wi-MAX, any other suitable communication protocol, or a combination thereof.

In some embodiments, prior to receiving the storage request, the server system determines (1006) a storage rating for the first client device of the distributed storage system based on storage availability and performance characteristics of the first client device, and the one or more predefined storage criteria at least include a minimum storage rating. In some embodiments, users (i.e., lessees) of distributed storage system 100 lease memory space from other users (i.e., lessors) of distributed storage system 100. In some embodiments, server system 108 or a component thereof (e.g., storage rating module 228, FIG. 2) determines a storage rating for each of the users of distributed storage system 100 that store (or are configured to store) lessee data in leased space on their respective client devices 104 (i.e., lessors). In some embodiments, storage rating module 228 determines a storage rating for a respective lessor based on a predefined algorithm that takes into account a combination of factors corresponding to the respective lessor such as one or more (or two or more) of: the average daily uptime (e.g., the amount of time lessee data is accessible), a data loss factor (e.g., (amount of data lost*length of time data stored)/total amount of data stored), the total amount of leased space, average upload and download speeds, a count of data tampering or detected viruses, average amount of time for servicing request (e.g., storage, fetch, and erase requests), and a withdrawal frequency (i.e., how often the respective lessor withdraws leased space for personal use).

In response to receiving the storage request (1008), the server system identifies (1010) a group of one or more other client devices from among the plurality of client devices that satisfy one or more predefined storage criteria. In some embodiments, server system 108 or a component thereof (e.g., matching module 230, FIG. 2) identifies a group of one or more lessors in distributed storage system 100 that satisfy storage criteria specified by the user (i.e., the lessee) of the first client device (e.g., in a user profile of the lessee). For example, the storage criteria include a minimum storage rating, minimum amount of uptime, a minimum amount of available leased space, a maximum distance from the lessee's base location, a maximum latency for fetch requests, and/or minimum upload and download speed.

In some embodiments, the one or more predefined criteria are stored (1012) in a user profile corresponding to a user of the first client device. In some embodiments, a user profile corresponding to the user of the first client device (e.g., lessee profile 500, FIG. 5) includes a storage criteria field indicating storage criteria that a lessor in distributed storage system 100 must satisfy in order for the lessee's data to be stored by the lessor.

In some embodiments, the server system determines (1014) a base location of the first client device of the distributed storage system, and the server system identifies the group of one or more other client devices by identifying the group of one or more other client devices in accordance with a criterion that the one or more other devices have base locations that are located within a predetermined radius of the determined base location of the first client device. In some embodiments, server system 108 or a component thereof (e.g., locality determination module 226, FIG. 2) determines a base location for users (e.g., lessees and lessors) of distributed storage system 100. For example, for a respective user of distributed storage system 100 (e.g., lessee or lessor), locality determination module 226 determines an address or absolute set of coordinates (e.g., longitudinal and latitudinal coordinates) where the respective user is most frequently located (e.g., based on GPS, WiFi, or other positioning means of client device 104 associated with the respective user) or where the respective user most frequently issues and/or services storage, fetch, and erase requests.

For example, with reference to FIG. 6A, storage criteria in a user profile associated with the user (i.e., lessee 612) of the first client device includes a maximum storage distance (or predetermined radius) indicating that the user wishes his/her data to be stored by lessors whose base locations are within 10 km of the user's base location (e.g., the location of lessee 612 in FIG. 6A). FIG. 6A shows a dotted circle 604 with a center corresponding to the base location of lessee 612 and a radius 602 corresponding to the maximum storage distance (e.g., 10 km) specified by lessee 612. In some embodiments, server system 108 or a component thereof (e.g., matching module 230, FIG. 2) matches lessee 612 with lessors based at least in part on the maximum storage distance. For example, with reference to FIG. 6A, matching module 230 matches lessee 612 with lessors 614-2, 614-3, 614-4, and 614-5 as their base locations are within 10 km of lessee 612's base location.

In some embodiments, the server system determines (1016) a base location of the first client device of the distributed storage system, and the server system identifies the group of one or more other client devices by identifying the group of one or more other client devices in accordance with a criterion that the one or more other devices have locations associated with communication times to the base location of the first client device that satisfy predetermined latency criteria. In some embodiments, server system 108 or a component thereof (e.g., locality determination module 226, FIG. 2) determines a base location for users (e.g., lessees and lessors) of distributed storage system 100. For example, for a respective user of distributed storage system 100 (e.g., lessee or lessor), locality determination module 226 determines an address or absolute set of coordinates (e.g., longitudinal and latitudinal coordinates) where the respective user is most frequently located (e.g., based on GPS, WiFi, or other positioning means of client device 104 associated with the respective user) or where the respective user most frequently issues and/or services storage, fetch, and erase requests.

For example, with reference to FIG. 6B, storage criteria in a user profile associated with the user (i.e., lessee 652) of the first client device includes a maximum latency indicating that the user wishes his/her data to be stored by lessors that satisfy a predefined latency criteria. In this example, the predefined latency criteria is satisfied when the amount of time (or latency) between issuance of a request (e.g., a storage, fetch, or erase request) by lessee 652 and service of the request by a lessor is less than a predetermined amount of time. In some embodiments, server system 108 or a component thereof (e.g., matching module 230, FIG. 2) matches lessee 652 with lessors based at least in part on the predefined latency criteria. For example, with reference to FIG. 6B, matching module 230 matches lessee 652 with lessors 654-2, 654-4, 654-5, and 654-8 as the amount of time (or latency) between issuance of a request (e.g., a storage, fetch, or erase request) by lessee 652 and service of the request by lessors 654-2, 654-4, 654-5, and 654-8 is less than the predetermined amount of time corresponding to the predefined latency criteria. In some implementations, the determination that a particular lessor satisfies a specified maximum latency is a determination that a predefined percentage (e.g., 68%, 86%, 98% or 99%) of data requests by lessee 652 are (or predicted to be) satisfied by the particular lessor in a time no greater than the specified maximum latency.

In some embodiments, the base location of the first client device is (1018) associated with a most frequent location corresponding to the first client device. For example, the determined base location for the user (i.e., a lessee such as lessee 612 in FIG. 6A or lessee 652 in FIG. 6B) of the first client device is a location the user spends more of his/her time than any other location (e.g., work or home) based on GPS, WiFi, or other positioning means of the first client device associated with the user.

In response to receiving the storage request (1008), the server system stores (1020) a data fragment of the data on each of the identified group of one or more other client devices. In some embodiments, after, prior to, or in parallel with identifying the group of one or more lessors, server system 108 or a component thereof (e.g., fragmenting module 234, FIG. 2) divides respective data associated with the storage request into a plurality of data fragments and, in some circumstances, encrypts each data fragment with a server-side sub-key. In some embodiments, server system 108 or a component thereof (e.g., fragmenting module 234, FIG. 2) divides the respective data into one or more fragments based on the storage rating and/or other characteristics (e.g., available leased memory space) corresponding to the identified group of one or more lessors. After the identifying the group of one or more lessors, server system 108 or a component thereof (e.g., distribution module 236, FIG. 2) issues storage requests to the selected group of one or more lessors to store one or more of the data fragments (or encrypted data fragments). In some embodiments, server system 108 stores a copy of the respective data in replicated data 114. For example, with reference to operation 1014 and FIG. 6A, distribution module 236 stores at least one data fragment of the data on each of lessors 614-2, 614-3, 614-4, and 614-5.

In some embodiments, the group of one or more other client devices are (1022) mobile computing devices, and a respective data fragment is stored in non-volatile memory of a respective mobile computing device. In some embodiments, the data fragments (or encrypted data fragments) are stored in non-volatile memory of client devices 104 associated with the identified group of one or more lessors. In some embodiments, client devices 104 associated with the identified group of one or more lessors are mobile phones or other mobile computing devices such as tablets, laptops, GPS navigation devices, wearable computing devices, and the like.

In some embodiments, in response to receiving an indication of a temporary location for the first client device, the server system relocates (1024) data most frequently accessed by the first client device to a new group of one or more other client devices that have base locations that are located within the predetermined radius of the temporary location for the first client device. For example, the user of the first client device goes on a work trip or a holiday and needs access to some of his/her data that is stored in distributed storage system 100 while away from his/her base location. In this example, the user of the first client device specifies a temporary location corresponding to the location of the work trip or the holiday trip. In some circumstances, the user of the first client device also specifies the data that he/she needs access to while away from his/her base location.

Continuing with this example, server system 108 or a component thereof relocates the most frequently used and/or specified data to be stored by one or more lessors with base locations within the maximum storage distance (or predefined radius) of the specified temporary location. Alternatively, server system 108 or a component thereof causes replica copies of the most frequently used and/or specified data to be stored by one or more lessors with base locations within the maximum storage distance of the specified temporary location. In some embodiments, the maximum storage distance is specified in a user profile associated with the user of the first client device. As such, the user of the first client device will have substantially similar access to the frequently used and/or specified data while at the temporary location as compared to his/her base location.

In some embodiments, for a respective lessee in distributed storage system 100, server system 108 or a component thereof (e.g., management module 220, FIG. 2) tracks lessee history information for the respective lessee such as the amount of memory space in distributed storage system 100 that is leased by the respective lessee, the amount of time the space has been leased, the amount of replica copies stored in distributed storage system 100, and a count of the number of issued requests (e.g., storage, erase, and fetch requests). For example, the lessee history information is included as an additional entry in a lessee profile 500 (FIG. 5) for the respective lessee that is stored in lessee profile database 254 (FIG. 2). In some embodiments, management module 220 debits an account specified by a user profile corresponding to the respective lessee based on the lessee history information.

In some embodiments, for a respective lessor in distributed storage system 100, server system 108 or a component thereof (e.g., management module 220, FIG. 2) tracks lessor history information such as the amount of memory space leased out by the respective lessor, the average daily uptime that lessee data stored by the respective lessor is accessible to corresponding lessees, the amount of the time that the lessee data has been stored by the respective lessor, and a count of the number of serviced requests (e.g., storage, erase, and fetch requests). For example, the lessor history information is included as additional entry in a lessor profile 550 (FIG. 5) for the respective lessor that is stored in lessor profile database 256 (FIG. 2). In some embodiments, management module 220 credits an account specified by a user profile corresponding to the respective lessor based on the lessor history information. In some embodiments, lessors are assigned to tiers based on their storage ratings. In some embodiments, the amount that a lessor is credited for leasing his/her memory space depends on their storage rating and/or assigned tier in addition to the lessor history information corresponding to the lessor.

Figure 11A:
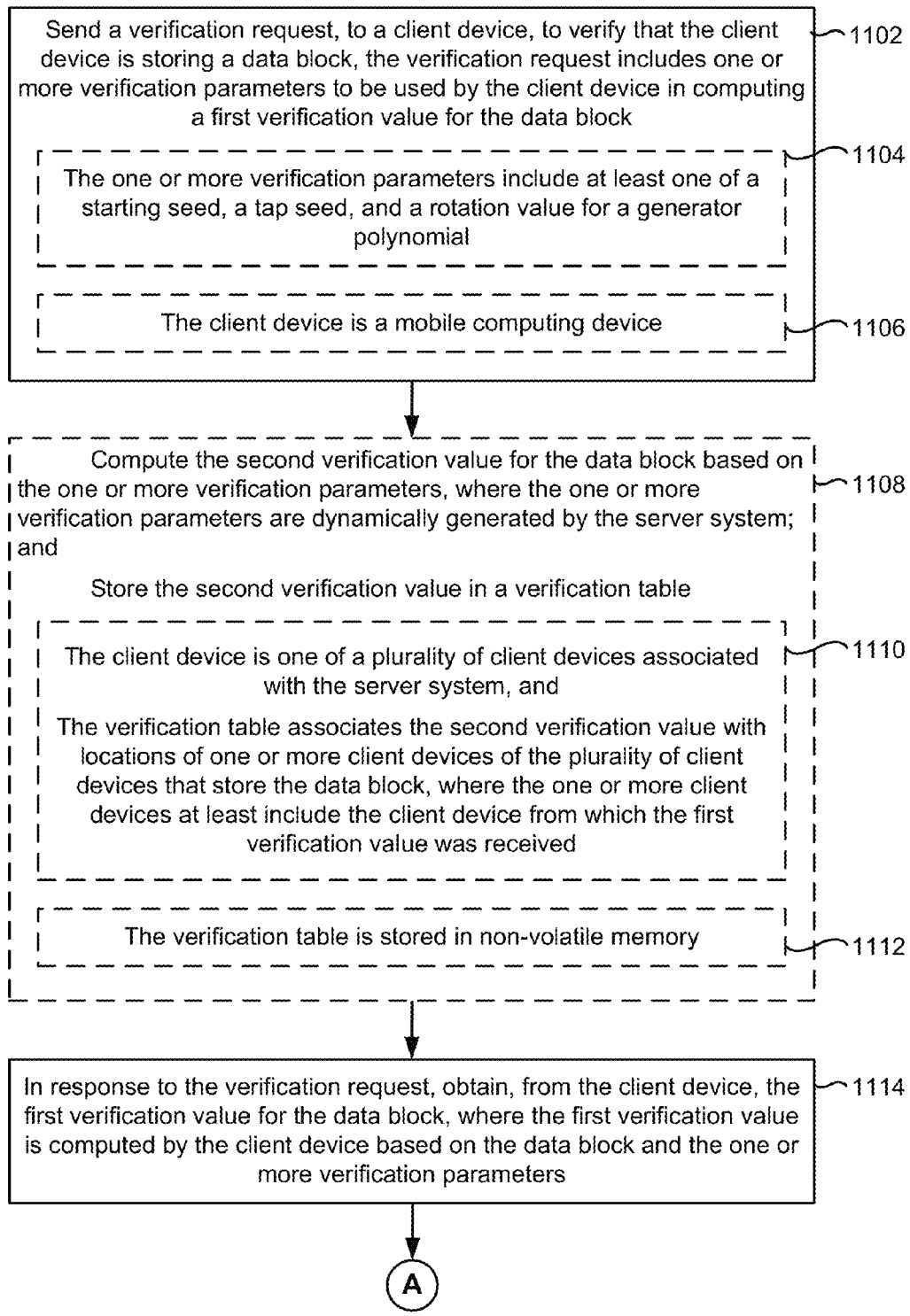
FIGS. 11A-11B illustrate a flowchart diagram of a method of verifying storage of data blocks in the distributed storage system in accordance with some embodiments.
Figure 11B:
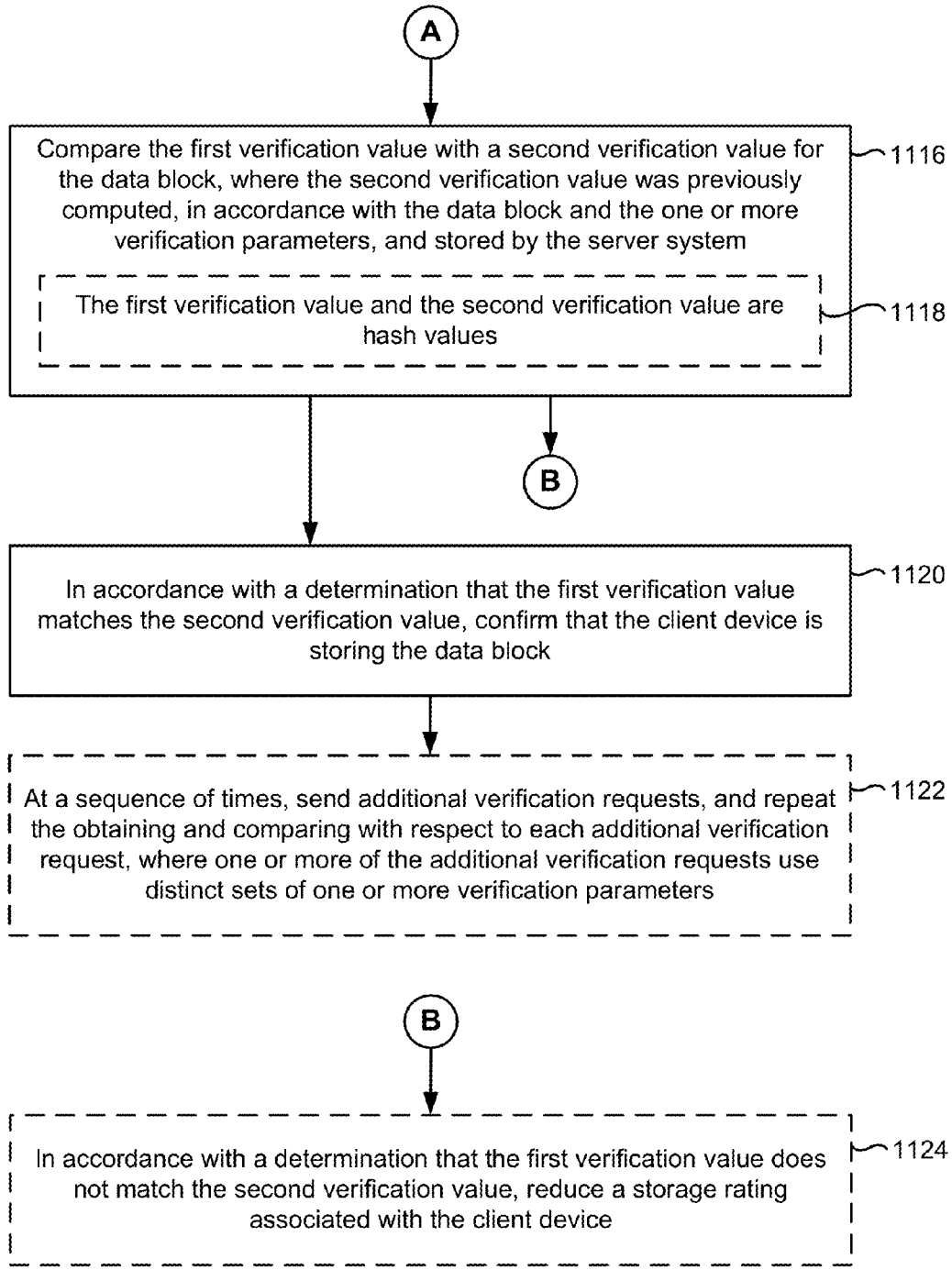

FIGS. 11A-11B illustrate a flowchart diagram of a method 1100 of verifying storage of data blocks in distributed storage system 100 in accordance with some embodiments. In some embodiments, distributed storage system 100 includes a server system and a plurality of client devices. In some embodiments, method 1100 is performed by the server system that includes one or more processors and memory. For example, in some embodiments, method 1100 is performed by server system 108 (FIGS. 1-2) or a component thereof (e.g., server-side module 106, FIGS. 1-2). In some embodiments, method 1100 is governed by instructions that are stored in a non-transitory computer readable storage medium and the instructions are executed by one or more processors of the server system. Optional operations are indicated by dashed lines (e.g., boxes with dashed-line borders).

The server system sends (1102) a verification request, to a client device, to verify that the client device is storing a data block, where the verification request includes one or more verification parameters to be used by the client device in computing a first verification value for the data block. In some embodiments, server system 108 or a component thereof (e.g., verification module 238, FIG. 2) verifies storage of a respective data block by one or more lessors in distributed storage system 100 by sending a verification request (sometimes also herein called a "storage challenge") to each of the one or more lessors storing the respective data block. In some embodiments, the respective data block is a single encrypted data fragment stored in memory of client devices 104 associated with the one or lessors.

In FIG. 8, for example, verification table 252 indicates that a respective data block (e.g., corresponding to data block identifier 802-N) is stored at one or more locations corresponding to the one or more lessors storing the respective data block (e.g., the one or more locations 804-N in verification table 252 include identifiers corresponding to the one or more lessors). Furthermore, in FIG. 8, the respective data block (e.g., corresponding to data block identifier 802-N) is associated with verification data 806-N. In FIG. 8, verification data 806-N is linked to a set of one or more sub-entries, where a respective sub-entry includes verification parameters 812-A and a corresponding verification value 814-A. As such, for example, verification module 238 sends verification requests identifying the respective data block (e.g., corresponding to data block identifier 802-N) to one or more locations 804-N corresponding to the one or more lessors storing the respective data block, where the verification request includes a set of verification parameters (e.g., verification parameters 812-A).

In some embodiments, the one or more verification parameters include (1104) at least one of a starting seed, a tap seed, and a rotation value for a generator polynomial. In FIG. 8, for example, verification parameters 812-N include a TAP seed 822, a starting seed 824, and a specified number of rotations 826 for producing a generator polynomial associated with verification value 814-N.

In some embodiments, the client device is (1106) a mobile computing device. In some embodiments, the data blocks (i.e., encrypted data fragments) are stored in non-volatile memory of client devices 104 associated with one or more lessors in distributed storage system 100. In some embodiments, client devices 104 associated with one or more lessors in distributed storage system 100 are mobile phones or other mobile computing devices such as tablets, laptops, GPS navigation devices, wearable computing devices, and the like.

In some embodiments, the server system (1108): computes the second verification value for the data block based on the one or more verification parameters, where the one or more verification parameters are dynamically generated by the server system; and stores the second verification value in a verification table. In some embodiments, server system 108 or a component thereof (e.g., verification module 238, FIG. 2) generates a plurality of distinct sub-entries for each data block stored in distributed storage system 100, where a respective sub-entry includes verification parameters and a corresponding verification value. For example, server system 108 or a component thereof (e.g., verification module 238, FIG. 2) randomly or pseudo-randomly generates the verification parameters (e.g., the starting seed, TAP seed, and number of rotations). In some embodiments, verification module 238 generates the plurality of distinct sub-entries for a respective data block prior to storage of the respective data block by the one or more lessors in distributed storage system 100, prior to issuing a verification request as to the respective data block, or on-the-fly when issuing a verification request as to the respective data block. For example, with reference to FIG. 8, verification value 814-A is hash value resulting from a verification process performed on the respective data block corresponding to data block identifier 802-N and the custom generator polynomial produced from verification parameters 812-A.

For example, over time, server system 108 or a component thereof (e.g., verification module 238, FIG. 2) issues a plurality of verification requests as to a same data block. In some embodiments, each verification request as to the same data block includes distinct verification parameters (e.g., a distinct set or distinct combination of verification parameters) associated with one of the sub-entries for the data block. In some embodiments, after exhausting the plurality of distinct sub-entries associated with the data block by issuing a corresponding number of verification requests, verification module 238 generates a new plurality of distinct sub-entries for subsequent verification requests.

In some embodiments, the client device is (1110) one of a plurality of client devices associated with the server system, and the verification table associates the second verification value with locations of one or more client devices of the plurality of client devices that store the data block, where the one or more client devices at least include the client device from which the first verification value was received. In some embodiments, for a respective data block, server system 108 sends verification requests to the one or more lessors storing the respective data block. For example, each of the one or more lessors in distributed storage system 100 is associated with a client device 104 that is communicatively coupled with server system 108 via one or more networks 110. For example, in FIG. 8, verification table 252 indicates that the respective data block (e.g., corresponding to data block identifier 802-N) is stored at one or more locations 804-N corresponding to the one or more lessors storing the data block (e.g., one or more locations 804-N includes identifiers corresponding to the one or more lessors). Furthermore, the entry in verification table 252 for the respective data block includes corresponding verification data 806-N. In FIG. 8, verification data 806-N is linked to a set of one or more sub-entries, where a respective sub-entry includes verification parameters 812-A and a corresponding verification value 814-A.

In some embodiments, the verification table is stored (1112) in non-volatile memory. In some embodiments, verification table 252 is stored in non-volatile memory in server system 108 or non-volatile memory located remotely from, but accessible to, server system 108.

In response to the verification request, the server system obtains (1114), from the client device, the first verification value for the data block, where the first verification value is computed by the client device based on the data block and the one or more verification parameters. In some embodiments, after receiving the verification request, the client device associated with a lessor in distributed storage system 100 performs a verification process to produce a verification value based on the one or more verification parameters included in the verification request and the data block identified by the verification request. In some embodiments, the one or more verification parameters are unknown to the lessor prior to receiving the verification request.

For example, the client device associated with the lessor in distributed storage system 100 performs the verification process using verification circuit 700 (FIG. 7), a software analog (e.g., verifying module 360, FIG. 3), or some combination of hardware, software, and/or firmware. In this example, with reference to FIG. 7, the one or more verification parameters (e.g., starting seed 704, TAP seed 702, and number of rotations 708) are input into verification circuit 700 to produce a generator polynomial that is then used to process the data block or a portion of the data block identified by the verification request so as to produce a verification value (e.g., hash value 716). In some embodiments, after the data block identified by the verification request has been processed, the verification process ends and the resulting verification value (e.g., the current hash value 716) is sent to server system 108.

The server system compares (1116) the first verification value with a second verification value for the data block, where the second verification value was previously computed, in accordance with the data block and the one or more verification parameters, and stored by the server system. For example, with reference to FIG. 8, server system 108 or a component thereof (e.g., verification module 238, FIG. 2) issues a verification request (e.g., a storage challenge) to one of the lessors identified by locations 804-N for a data block corresponding to data block identifier 802-N. In this example, the verification request includes verification parameters 812-A. Continuing with this example, server system 108 or a component thereof (e.g., verification module 238, FIG. 2) receives a verification value from one of the one or more lessors in response to the verification request. In this example, server system 108 or a component thereof (e.g., verification module 238, FIG. 2) compares the verification value received from the lessor against verification value 814-A.

In some embodiments, the first verification value and the second verification value are (1118) hash values. For example, with reference to FIG. 7, after verification circuit 700 completes the verification process, the verification value is the current hash value 716.

In accordance with a determination that the first verification value matches the second verification value, the server system confirms (1120) that the client device is storing the data block. Continuing with the example in operation 1116 with reference to FIG. 8, in accordance with a determination that the verification value received from the lessor matches verification value 814-A, server system 108 confirms that the lessor is storing the data block associated with the verification request.

In some embodiments, at a sequence of times, the server system sends (1122) additional verification requests, and repeats the obtaining and comparing with respect to each additional verification request, where one or more of the additional verification requests use distinct sets of one or more verification parameters. For example, server system 108 produces and stores, in verification table 252, P generator polynomials (e.g., associated with P sets of verification parameters) and P corresponding verification values for use in P storage challenges of a respective data block. After P storage challenges, server system 108 deletes the P generator polynomials and P corresponding verification values from verification table 252. Subsequently, server system 108 produces and stores, in verification table 252, Q generator polynomials (e.g., associated with Q sets of verification parameters) and Q corresponding verification values for use in Q subsequent storage challenges of the respective data block. In this example, the P generator polynomials and the Q generator polynomials are all distinct generator polynomials. Thus, the P corresponding verification values and the Q corresponding verification values are all distinct verification values.

In some embodiments, in accordance with a determination that the first verification value does not match the second verification value, the server system reduces (1124) a storage rating associated with the client device. Continuing with the example in operation 1116 with reference to FIG. 8, in accordance with a determination that the verification value received from the lessor does not match verification value 814-A, server system 108 reduces the storage rating of the lessor (as the lessor is no longer storing the data block associated with the verification request) and increments a count of failed storage challenges for the lessor. For example, when the count of failed storage challenges for the lessor exceeds a predetermined count, the lessor is barred from participating in distributed storage system 100 as a lessor (e.g., the lessor is added to a blacklist). In some embodiments, the predetermined count factors for memory malfunctions associated with the client device 104 which are not associated with malfeasance by the lessor (e.g., a singular failure due to a storage media failure). Optionally, in some embodiments, failure by a lessor (client device 104) to timely respond to a verification request is treated by the server system as a failed storage challenge for the lessor, since a fraudulent lessor may choose to not timely respond to a verification request rather than return a verification value that it knows will fail to match the verification value known to the server system.

FIGS. 12A-12B illustrate a flowchart diagram of a method 1200 of recovering data stored in distributed storage system 100 in accordance with some embodiments. In some embodiments, distributed storage system 100 includes a server system and a plurality of client devices. In some embodiments, method 1200 is performed by a first client device of the plurality of client devices, where the first client device includes one or more processors and memory. For example, in some embodiments, method 1200 is performed by client device 104 (FIGS. 1 and 3) or a component thereof (e.g., client-side module 102, FIGS. 1 and 3). In some embodiments, method 1200 is governed by instructions that are stored in a non-transitory computer readable storage medium and the instructions are executed by one or more processors of the client device. Optional operations are indicated by dashed lines (e.g., boxes with dashed-line borders).

For example, with reference to FIG. 9, a user of a client device 104 (i.e., lessee 912) intends to store respective data (e.g., one or more files) in distributed storage system 100 so as to backup the respective data in case of the loss or reformatting of his/her client device 104. In order to store the respective data in distributed storage system 100, lessee 912 executes client-side module 102, which provides client-side functions for distributed storage system 100 and facilitates communication with server system 108, on the client device 104. In some embodiments, client-side module 102 or a component thereof (e.g., fragmenting module 336, FIG. 3) divides the respective data into a plurality of data fragments 904-1, 904-2, 904-3, and 904-4, and client-side module 102 or a component thereof (e.g., cryptography module 338, FIG. 3) encrypts each of the plurality of data fragments with a distinct sub-key (e.g., sub-keys 902-1, 902-2, 902-3, and 902-4). Subsequently, client-side module 102 or a component thereof (e.g., cryptography module 338, FIG. 3) generates a key group 906 by encrypting the distinct sub-keys 902-1, 902-2, 902-3, and 902-4 associated with the plurality of data fragments 904-1, 904-2, 904-3, and 904-4 with a master key 908 (e.g., a plain text password).

Thereafter, continuing with the example above, client-side module 102 or a component thereof (e.g., request handling module 332, FIG. 3) issues a storage request to server system 108 and sends encrypted key group 906 to server system 108 for storage. Subsequently, in this example, server system 108 obtains the encrypted data fragments 904-1, 904-2, 904-3, and 904-4 and matches lessee 912 with lessors 914-2, 914-3, 914-4, and 914-5 based on storage criteria specified in a user profile corresponding to lessee 912 and the storage ratings for lessors 914-2, 914-3, 914-4, and 914-5. Subsequently, in this example, at least one of the data fragments is stored by each of lessors 914-2, 914-3, 914-4, and 914-5, and server system 108 notes in fragment map 116 that lessor 914-2 is storing data fragment 904-1, lessor 914-3 is storing data fragment 904-2, lessor 914-4 is storing data fragment 904-3, and lessor 914-5 is storing data fragment 904-4. Continuing with this example, after issuing the storage request with respect to the respective data, lessee 912 loses his/her client device 104, or the lessee's client device is destroyed are rendered unusable.

Continuing with the above example, lessee obtains a new client device 104 (e.g., the first client device) and downloads client-side module 102 associated with distributed storage system 100 (e.g., from an application marketplace). Further in this example, lessee 912 initiates a recovery process so as to recover the respective data stored in distributed storage system 100 by issuing a recovery request (e.g., via recovery module 342, FIG. 3) to server system 108. In particular, the first client device sends (1202) a request, to a server system, for a key group associated with the data stored in the distributed storage system.

In some embodiments, the request includes (1204) authentication information for a user of the first client device. In some embodiments, prior to or in combination with the recovery request, lessee 912 logins into distributed storage system 100 with his/her previously established login credentials. As such, server system 108 or a component thereof (e.g., authentication module 240, FIG. 2) verifies that the login credentials entered by lessee 912 match previously stored login credentials.

In response to the request, the first client device receives (1206), from the server system, the key group. Continuing with the example in operation 1202, in response to issuing the recovery request, lessee 912 receives key group 906 from server system 108

The first client device decrypts (1208) the key group so as to obtain a plurality of keys for a plurality of data fragments stored in the distributed storage system at a set of client devices other than the first client device, where for each data fragment of the plurality of data fragments there is a corresponding key in the plurality of keys. Continuing with the example in operation 1206, lessee 912 decrypts key group 906 with master key 908 (e.g., the plain text password) so as to obtain distinct sub-keys 902-1, 902-2, 902-3, and 902-4 associated with the plurality of data fragments 904-1, 904-2, 904-3, and 904-4.

In some embodiments, a respective data fragment of the plurality of data fragments stored in the distributed storage system is stored (1210), as an encrypted data fragment encrypted with a key in the plurality of keys that corresponds to the data fragment, in at least two distinct client devices of the set of client devices other than the first client device. In FIG. 9, for example, each of encrypted data fragments 904-1, 904-2, 904-3, and 904-4, which are associated with the respective data of lessee 912, is stored by at least two of lessors 914-2, 914-3, 914-4, and 914-5.

In some embodiments, the first client device and the other client devices are (1212) mobile computing devices. With reference to FIG. 9, for example, the first client device associated with lessee 912 and the other client devices associated with lessors 914-2, 914-3, 914-4, and 914-5. In some embodiments, the first client device and other client devices in distributed storage system 100 are mobile phones or other mobile computing devices such as tablets, laptops, GPS navigation devices, wearable computing devices, and the like.

For at least two respective data fragments of the plurality of data fragments (1214), the first client device: receives (1216) the respective data fragment from one of the set of other client devices of the distributed storage system; and decrypts (1218) the respective data fragment with the corresponding key. Continuing with the example in operation 1208, lessee 912 recovers the respective data by issuing a fetch request to server system 108, obtaining data fragments 904-1, 904-2, 904-3, and 904-4, and decrypting data fragments 904-1, 904-2, 904-3, and 904-4 with sub-keys 902-1, 902-2, 902-3, and 902-4.

In some embodiments, in response to the request, the first client device receives (1220), from the server system, access information (e.g., a network address) for two or more of the plurality of data fragments (e.g., in addition to the key group). Continuing with the example in operation 1208, in addition to key group 906, lessee 912 obtains location information from server system 108 indicating unique identifiers for and/or the locations of lessors 914-2, 914-3, 914-4, and 914-5 storing data fragments data fragments 904-1, 904-2, 904-3, and 904-4, respectively. To this end, lessee 912 obtains data fragments 904-1, 904-2, 904-3, and 904-4 directly from lessors 914-2, 914-3, 914-4, and 914-5, respectively, according to the location information.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible (e.g., a NOR memory array). NAND and NOR memory configurations are exemplary, and memory elements may be otherwise configured.

The semiconductor memory elements located within and/or over a substrate may be arranged in two or three dimensions, such as a two dimensional memory structure or a three-dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration (e.g., in an x-z plane), resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of verifying storage of data blocks, the method comprising:
    at a server system with one or more processors and memory:
        sending a verification request, from the server system to a first client device, to verify that the first client device is storing a data block on behalf of a second client device, the verification request including one or more verification parameters to be used by the first client device in computing a first verification value for the data block, wherein:

the first client device leases memory space for storing data to one or more other client devices, including the second client device; and the first client device has a storage rating, which is used by the second client device to determine if the first client device satisfies storage criteria for storing data of the second client device;

in response to the verification request, obtaining, from the first client device, the first verification value for the data block, wherein the first verification value is computed by the first client device based on the data block and the one or more verification parameters;

comparing the first verification value with a second verification value for the data block, wherein the second verification value was previously computed, in accordance with the data block and the one or more verification parameters, and stored by the server system;

in accordance with a determination that the first verification value matches the second verification value, confirming that the first client device is storing the data block; and in accordance with a determination that the first verification value does not match the second verification value, reducing the storage rating associated with the first client device.

2. The method of claim 1, further comprising:
computing the second verification value for the data block based on the one or more verification parameters, wherein the one or more verification parameters are dynamically generated by the server system; and storing the second verification value in a verification table.

3. The method of claim 2, wherein:
the first client device is one of a plurality of client devices associated with the server system;

the verification table associates the second verification value with locations of one or more client devices of the plurality of client devices that store the data block; and the one or more client devices include at least the first client device from which the first verification value was obtained.

4. The method of claim 2, wherein the verification table is stored in non-volatile memory.

5. The method of claim 1, wherein the first verification value and the second verification value are hash values.

6. The method of claim 1, wherein the one or more verification parameters include at least one of a starting seed, a tap seed, and a rotation value for a generator polynomial.

7. The method of claim 1, wherein the first client device is a mobile computing device.

8. The method of claim 1, further comprising: at a sequence of times, sending additional verification requests; and repeating the obtaining and comparing with respect to each additional verification request, wherein one or more of the additional verification requests use distinct sets of one or more verification parameters.

9. A server system, comprising:
one or more processors; and
memory storing one or more programs to be executed by the one or more processors, the one or more programs comprising instructions for:
sending a verification request, to a first client device, to verify that the first client device is storing a data block on behalf of a second client device, the verification request including one or more verification parameters to be used by the first client device in computing a first verification value for the data block, wherein:

the first client device leases memory space for storing data to one or more other client devices, including the second client device; and the first client device has a storage rating, which is used by the second client device to determine if the first client device satisfies storage criteria for storing data of the second client device;

in response to the verification request, obtaining, from the first client device, the first verification value for the data block, wherein the first verification value is computed by the first client device based on the data block and the one or more verification parameters;

comparing the first verification value with a second verification value for the data block, wherein the second verification value was previously computed, in accordance with the data block and the one or more verification parameters, and stored by the server system;

in accordance with a determination that the first verification value matches the second verification value, confirming that the first client device is storing the data block; and in accordance with a determination that the first verification value does not match the second verification value, reducing the storage rating associated with the first client device.

10. The server system of claim 9, wherein the one or more programs further comprise instructions for:
computing the second verification value for the data block based on the one or more verification parameters, wherein the one or more verification parameters are dynamically generated by the server system; and storing the second verification value in a verification table.

11. The server system of claim 10, wherein:
the first client device is one of a plurality of client devices associated with the server system;

the verification table associates the second verification value with locations of one or more client devices of the plurality of client devices that store the data block; and the one or more client devices at least include the first client device from which the first verification value was obtained.

12. The server system of claim 10, wherein the verification table is stored in non-volatile memory.

13. The server system of claim 9, wherein the first verification value and the second verification value are hash values.

14. The server system of claim 9, wherein the one or more verification parameters include at least one of a starting seed, a tap seed, and a rotation value for a generator polynomial.

15. The server system of claim 9, wherein the first client device is a mobile computing device.

16. The server system of claim 9, wherein the one or more programs further comprise instructions for:
at a sequence of times, sending additional verification requests; and repeating the obtaining and comparing with respect to each additional verification request, wherein one or more of the additional verification requests use distinct sets of one or more verification parameters.

17. A non-transitory computer readable storage medium storing one or more programs, the one or more programs comprising instructions which, when executed by a server system with one or more processors, cause the server system to perform operations comprising:

sending a verification request, from the server system to a first client device, to verify that the first client device is storing a data block on behalf of a second client device, the verification request including one or more verification parameters to be used by the first client device in computing a first verification value for the data block, wherein:
- the first client device leases memory space for storing data to one or more other client devices, including the second client device; and
- the first client device has a storage rating, which is used by the second client device to determine if the first client device satisfies storage criteria for storing data of the second client device;

in response to the verification request, obtaining, from the first client device, the first verification value for the data block, wherein the first verification value is computed by the first client device based on the data block and the one or more verification parameters;

comparing the first verification value with a second verification value for the data block, wherein the second verification value was previously computed, in accordance with the data block and the one or more verification parameters, and stored by the server system;

in accordance with a determination that the first verification value matches the second verification value, confirming that the first client device is storing the data block; and in accordance with a determination that the first verification value does not match the second verification value, reducing the storage rating associated with the first client device.

18. The non-transitory computer readable storage medium of claim 17, wherein the one or more programs further comprise instructions which cause the server system to:
compute the second verification value for the data block based on the one or more verification parameters, wherein the one or more verification parameters are dynamically generated by the server system; and
store the second verification value in a verification table.

19. A server system, comprising:
means for sending a verification request to a first client device to verify that the first client device is storing a data block on behalf of a second client device, the verification request including one or more verification parameters to be used by the first client device in computing a first verification value for the data block, wherein:
- the first client device leases memory space for storing data to one or more other client devices, including the second client device; and
- the first client device has a storage rating, which is used by the second client device to determine if the first client device satisfies storage criteria for storing data of the second client device;

means for obtaining from the first client device, in response to the verification request, the first verification value for the data block, wherein the first verification value is computed by the first client device based on the data block and the one or more verification parameters;

means for comparing the first verification value with a second verification value for the data block, wherein the second verification value was previously computed, in accordance with the data block and the one or more verification parameters, and stored by the server system;

means, enabled in accordance with a determination that the first verification value matches the second verification value, for confirming that the first client device is storing the data block; and means, enabled in accordance with a determination that the first verification value does not match the second verification value, for reducing the storage rating associated with the first client device.

* * * * *